(12) United States Patent
Muratoglu et al.

(10) Patent No.: US 7,985,781 B2
(45) Date of Patent: *Jul. 26, 2011

(54) PVA HYDROGEL

(75) Inventors: Orhun K. Muratoglu, Cambridge, MA (US); Stephen H. Spiegelberg, Winchester, MA (US); Jeffrey W. Ruberti, Lexington, MA (US); Niels A. Abt, Winterthur (CH)

(73) Assignee: Zimmer GmbH (CH)

( * ) Notice: Subject to any disclaimer, the term of this patent is extended or adjusted under 35 U.S.C. 154(b) by 84 days.

This patent is subject to a terminal disclaimer.

(21) Appl. No.: 12/170,303

(22) Filed: Jul. 9, 2008
(Under 37 CFR 1.47)

(65) Prior Publication Data
US 2009/0131548 A1 May 21, 2009

Related U.S. Application Data

(63) Continuation of application No. 11/577,585, filed as application No. PCT/EP2005/010931 on Oct. 11, 2005, now abandoned.

(30) Foreign Application Priority Data

Jan. 19, 2005 (EP) .................... 05001009

(51) Int. Cl.
| | |
|---|---|
| A61K 27/14 | (2006.01) |
| A61K 24/04 | (2006.01) |
| C08L 29/00 | (2006.01) |
| C08L 39/00 | (2006.01) |
| C08F 116/06 | (2006.01) |
| C08F 116/34 | (2006.01) |
| C08F 118/08 | (2006.01) |
| C08F 126/10 | (2006.01) |
| A61F 2/02 | (2006.01) |

(52) U.S. Cl. .......... 522/79; 522/152; 522/153; 522/154; 522/150; 522/86; 351/160 R; 623/1.1; 623/1.42; 623/7; 623/8; 623/11.11; 623/23.58; 524/803; 524/808; 524/818

(58) Field of Classification Search ............ 522/86, 522/150, 151, 153, 154, 79, 152; 524/803, 524/808, 818; 351/160 R; 623/1.1, 1.42, 623/7, 8, 11.11, 23.58
See application file for complete search history.

(56) References Cited

U.S. PATENT DOCUMENTS 3,200,178 A 8/1965 Kanji
(Continued)

FOREIGN PATENT DOCUMENTS

EP 0256293 2/1988
(Continued)

OTHER PUBLICATIONS

EP Search Report for EP06255568.5, Jun. 15, 2007.
(Continued)

*Primary Examiner* — Susan W Berman
(74) *Attorney, Agent, or Firm* — Cook Alex Ltd.

(57) ABSTRACT

The present invention provides methods of making covalently crosslinked vinyl polymer hydrogels having advantageous physical properties, and covalently crosslinked vinyl polymer hydrogel compositions made by such methods, as well as articles of manufacture comprising such covalently crosslinked vinyl polymer hydrogel compositions. The physical properties of the produced hydrogels can be adjusted by varying controlled parameters such as the proportion of physical associations, the concentration of polymer and the amount of radiation applied. Such covalently crosslinked vinyl polymer hydrogels can be made translucent, preferably transparent, or opaque depending on the processing conditions. The stability of the physical properties of the produced vinyl polymer hydrogel can be enhanced by controlling the amount of covalent crosslinks.

29 Claims, 10 Drawing Sheets

U.S. PATENT DOCUMENTS

| | | | |
|---|---|---|---|
| 3,862,265 A | 1/1975 | Steinkamp | |
| 3,875,302 A | 4/1975 | Inoue | |
| 4,036,788 A | 7/1977 | Steckler | |
| 4,058,491 A | 11/1977 | Steckler | |
| 4,060,678 A | 11/1977 | Steckler | |
| 4,071,508 A | 1/1978 | Steckler | |
| 4,279,795 A | 7/1981 | Yamashita | |
| 4,300,820 A | 11/1981 | Shah | |
| 4,379,874 A | 4/1983 | Stoy | |
| 4,451,599 A | 5/1984 | Odorzynski | |
| 4,451,630 A | 5/1984 | Atkinson | |
| 4,464,438 A | 8/1984 | Lu | |
| 4,472,542 A | 9/1984 | Nambu | |
| 4,640,941 A | 2/1987 | Park | |
| 4,656,216 A | 4/1987 | Muller | |
| 4,663,358 A | 5/1987 | Hyon | |
| 4,664,857 A | 5/1987 | Nambu | |
| 4,699,146 A * | 10/1987 | Sieverding | 600/391 |
| 4,734,097 A | 3/1988 | Tanabe | |
| 4,771,089 A | 9/1988 | Ofstead | |
| 4,772,287 A | 9/1988 | Ray | |
| 4,808,353 A | 2/1989 | Nambu | |
| 4,842,597 A | 6/1989 | Brook | |
| 4,851,168 A | 7/1989 | Graiver | |
| 4,859,719 A | 8/1989 | Ofstead | |
| 4,871,490 A | 10/1989 | Rosiak | |
| 4,874,562 A | 10/1989 | Hyon | |
| 4,915,974 A | 4/1990 | D'Amelia | |
| 4,956,133 A | 9/1990 | Payne | |
| 4,966,924 A | 10/1990 | Hyon | |
| 4,988,761 A | 1/1991 | Ikada | |
| 5,028,648 A | 7/1991 | Famili | |
| 5,047,055 A | 9/1991 | Bao | |
| 5,053,455 A | 10/1991 | Kroggel | |
| 5,106,876 A * | 4/1992 | Kawamura | 522/5 |
| 5,118,779 A | 6/1992 | Szycher | |
| 5,122,565 A | 6/1992 | George | |
| 5,157,093 A | 10/1992 | Harisiades | |
| 5,189,097 A | 2/1993 | LaFleur | |
| 5,192,326 A | 3/1993 | Bao | |
| 5,244,799 A | 9/1993 | Anderson | |
| 5,276,079 A * | 1/1994 | Duan et al. | 524/386 |
| 5,288,503 A | 2/1994 | Wood | |
| 5,306,311 A | 4/1994 | Stone | |
| 5,311,223 A | 5/1994 | Vanderlaan | |
| 5,315,478 A | 5/1994 | Cadwell | |
| 5,334,634 A | 8/1994 | Bastiolo | |
| 5,336,551 A | 8/1994 | Graiver | |
| 5,358,525 A | 10/1994 | Fox | |
| 5,360,830 A | 11/1994 | Bastioli | |
| 5,362,803 A | 11/1994 | LaFleur | |
| 5,364,547 A | 11/1994 | Babb et al. | |
| 5,407,055 A | 4/1995 | Tanaka | |
| 5,409,966 A * | 4/1995 | Duan et al. | 522/152 |
| 5,410,016 A | 4/1995 | Hubbell | |
| 5,458,643 A | 10/1995 | Oka | |
| 5,527,271 A | 6/1996 | Shah | |
| 5,540,033 A * | 7/1996 | Fox et al. | 53/425 |
| 5,552,096 A | 9/1996 | Auda | |
| 5,576,072 A | 11/1996 | Hostettler | |
| 5,580,938 A | 12/1996 | Gutweiller | |
| 5,624,463 A | 4/1997 | Stone | |
| 5,632,774 A | 5/1997 | Babian | |
| 5,674,295 A | 10/1997 | Ray | |
| 5,681,300 A | 10/1997 | Ahr | |
| 5,705,296 A * | 1/1998 | Kamauchi et al. | 429/330 |
| 5,709,854 A | 1/1998 | Griffith-Cima | |
| 5,711,960 A | 1/1998 | Shikinami | |
| 5,716,404 A | 2/1998 | Vacanti | |
| 5,723,331 A | 3/1998 | Tubo | |
| 5,834,029 A | 11/1998 | Bellamkonda | |
| 5,879,713 A * | 3/1999 | Roth et al. | 424/489 |
| 5,891,826 A | 4/1999 | Tsaur et al. | |
| 5,941,909 A | 8/1999 | Purkait | |
| 5,976,186 A | 11/1999 | Bao | |
| 5,981,826 A | 11/1999 | Ku | |
| 6,015,576 A | 1/2000 | See | |
| 6,017,577 A | 1/2000 | Hostettler | |
| 6,040,493 A | 3/2000 | Cooke | |
| 6,080,488 A | 6/2000 | Hostettler | |
| 6,117,449 A | 9/2000 | See | |
| 6,120,904 A | 9/2000 | Hostettler | |
| 6,121,341 A | 9/2000 | Sawhney | |
| 6,129,761 A | 10/2000 | Hubbell | |
| 6,132,468 A | 10/2000 | Mansmann | |
| 6,139,963 A | 10/2000 | Fujii | |
| 6,146,686 A | 11/2000 | Leitao | |
| 6,156,345 A | 12/2000 | Chudzik | |
| 6,156,572 A | 12/2000 | Bettamkonda | |
| 6,162,456 A | 12/2000 | Dunbar | |
| 6,180,132 B1 | 1/2001 | Huang | |
| 6,180,606 B1 | 1/2001 | Chen | |
| 6,184,197 B1 | 2/2001 | Heinzman | |
| 6,187,048 B1 | 2/2001 | Milner et al. | |
| 6,207,185 B1 | 3/2001 | See | |
| 6,211,296 B1 | 4/2001 | Frate | |
| 6,224,893 B1 | 5/2001 | Langer | |
| 6,231,605 B1 | 5/2001 | Ku | |
| 6,232,406 B1 | 5/2001 | Stoy | |
| 6,238,691 B1 | 5/2001 | Huang | |
| 6,268,405 B1 | 7/2001 | Yao | |
| 6,271,278 B1 | 8/2001 | Park | |
| 6,280,475 B1 | 8/2001 | Bao | |
| 6,306,424 B1 | 10/2001 | Vyakarnam | |
| 6,365,149 B2 | 4/2002 | Vyakarnam | |
| 6,371,984 B1 | 4/2002 | Van Dyke | |
| 6,372,283 B1 | 4/2002 | Shim | |
| 6,375,634 B1 | 4/2002 | Carroll | |
| 6,387,325 B1 | 5/2002 | Keusch | |
| 6,402,784 B1 | 6/2002 | Wardlaw | |
| 6,443,988 B2 | 9/2002 | Felt | |
| 6,509,098 B1 | 1/2003 | Merrill | |
| 6,531,147 B2 | 3/2003 | Sawhney | |
| 6,533,817 B1 | 3/2003 | Norton | |
| 6,583,219 B2 | 6/2003 | Won | |
| 6,602,952 B1 | 8/2003 | Bentley | |
| 6,608,117 B1 | 8/2003 | Gvozdic | |
| 6,620,196 B1 | 9/2003 | Trieu | |
| 6,626,945 B2 | 9/2003 | Simon | |
| 6,629,997 B2 | 10/2003 | Mansmann | |
| 6,630,457 B1 | 10/2003 | Aeschlimann | |
| 6,632,246 B1 | 10/2003 | Simon | |
| 6,645,517 B2 | 11/2003 | West | |
| 6,692,738 B2 | 2/2004 | MacLaughlin | |
| 6,706,690 B2 | 3/2004 | Reich | |
| 6,709,668 B2 | 3/2004 | Won | |
| 6,710,104 B2 | 3/2004 | Haraguchi | |
| 6,710,126 B1 | 3/2004 | Hirt | |
| 6,723,781 B1 | 4/2004 | Frate | |
| 6,730,298 B2 | 5/2004 | Griffith-Cima | |
| 6,733,533 B1 | 5/2004 | Lozier | |
| 6,780,840 B1 | 8/2004 | DeVore | |
| 6,783,546 B2 | 8/2004 | Zucherman | |
| 6,783,721 B2 | 8/2004 | Higham | |
| 6,803,420 B2 | 10/2004 | Cleary | |
| 6,852,772 B2 | 2/2005 | Muratoglu | |
| 6,855,743 B1 | 2/2005 | Gvozdic | |
| 6,861,067 B2 | 3/2005 | McGhee | |
| 7,235,592 B2 * | 6/2007 | Muratoglu et al. | 522/154 |
| 7,531,000 B2 | 5/2009 | Hodorek | |
| 7,799,352 B2 * | 9/2010 | Nho et al. | 424/725 |
| 2001/0026810 A1 | 10/2001 | McGhee | |
| 2001/0032019 A1 | 10/2001 | Van Dyke | |
| 2001/0049417 A1 | 12/2001 | Frate | |
| 2001/0053897 A1 | 12/2001 | Frate | |
| 2002/0022884 A1 | 2/2002 | Mansmann | |
| 2002/0026244 A1 | 2/2002 | Trieu | |
| 2002/0029083 A1 | 3/2002 | Zucherman | |
| 2002/0049498 A1 | 4/2002 | Yuksel | |
| 2002/0131952 A1 | 9/2002 | Hennink | |
| 2002/0151979 A1 | 10/2002 | Lambrecht | |
| 2002/0173855 A1 | 11/2002 | Mansmann | |
| 2002/0193531 A1 | 12/2002 | Stoy | |
| 2003/0008396 A1 | 1/2003 | Ku | |
| 2003/0065389 A1 | 4/2003 | Petersen | |
| 2003/0080465 A1 | 5/2003 | Higham | |
| 2003/0099709 A1 | 5/2003 | Shah | |

| | | |
|---|---|---|
| 2003/0130427 A1 | 7/2003 | Cleary |
| 2003/0152528 A1 | 8/2003 | Singh et al. |
| 2003/0170308 A1 | 9/2003 | Cleary |
| 2003/0195628 A1 | 10/2003 | Bao |
| 2003/0232895 A1 | 12/2003 | Omidian |
| 2003/0236323 A1 | 12/2003 | Ratner |
| 2004/0002764 A1 | 1/2004 | Gainor |
| 2004/0005423 A1 | 1/2004 | Dalton |
| 2004/0030392 A1 | 2/2004 | Lambrecht |
| 2004/0039447 A1 | 2/2004 | Simon |
| 2004/0092653 A1 | 5/2004 | Ruberti |
| 2004/0096509 A1 | 5/2004 | Hutchens |
| 2004/0116641 A1 | 6/2004 | Mather |
| 2004/0121951 A1 | 6/2004 | Rhee |
| 2004/0127618 A1 | 7/2004 | Ulmer |
| 2004/0127992 A1 | 7/2004 | Serhan |
| 2004/0131582 A1 | 7/2004 | Grinstaff |
| 2004/0133280 A1 | 7/2004 | Trieu |
| 2004/0143329 A1 | 7/2004 | Ku |
| 2004/0147673 A1 | 7/2004 | Calabro |
| 2004/0153163 A1 | 8/2004 | Posner |
| 2004/0161444 A1 | 8/2004 | Song |
| 2004/0171740 A1 | 9/2004 | Ruberti |
| 2004/0199250 A1 | 10/2004 | Fell |
| 2004/0220296 A1 | 11/2004 | Lowman |
| 2004/0242770 A1 | 12/2004 | Feldstein |
| 2004/0244978 A1 | 12/2004 | Shaarpour |
| 2005/0004560 A1 | 1/2005 | Cox |
| 2005/0027069 A1 | 2/2005 | Rhee |
| 2005/0048103 A1 | 3/2005 | Cleary |
| 2005/0049365 A1 | 3/2005 | Cleary |
| 2005/0075454 A1 | 4/2005 | Plochocka et al. |
| 2005/0095296 A1 | 5/2005 | Lowman |
| 2005/0107561 A1 | 5/2005 | Lee et al. |
| 2005/0197441 A1 | 9/2005 | Shibutani |
| 2006/0078587 A1 | 4/2006 | Leong |
| 2006/0141002 A1 | 6/2006 | Liu |
| 2006/0188487 A1 | 8/2006 | Thomas |
| 2007/0004861 A1 | 1/2007 | Cai |
| 2007/0202323 A1 | 8/2007 | Kleiner |
| 2007/0293651 A1 | 12/2007 | Tada |
| 2008/0090145 A1 | 4/2008 | Hiwara |
| 2009/0053318 A1* | 2/2009 | Tan et al. ............... 424/501 |

FOREIGN PATENT DOCUMENTS

| | | |
|---|---|---|
| EP | 0290616 | 11/1988 |
| EP | 0365108 | 4/1990 |
| EP | 0505634 | 9/1992 |
| EP | 0696210 | 2/1996 |
| EP | 0738762 | 4/1996 |
| EP | 0784987 | 7/1997 |
| EP | 0845480 | 6/1998 |
| EP | 0927053 | 7/1999 |
| EP | 1079224 | 2/2001 |
| EP | 1174463 | 1/2002 |
| EP | 1593400 | 11/2005 |
| EP | 1595899 | 11/2005 |
| FR | 2786400 | 6/2000 |
| FR | 2865939 | 8/2005 |
| FR | 2866571 | 8/2005 |
| GB | 2338958 | 10/2000 |
| JP | 01178545 | 7/1989 |
| JP | 01305959 | 12/1989 |
| JP | 03141957 | 6/1991 |
| JP | 04303444 | 10/1992 |
| JP | 09124730 | 5/1997 |
| JP | 09124731 | 5/1997 |
| JP | 10036524 | 2/1998 |
| JP | 10036534 | 2/1998 |
| JP | 10043286 | 2/1998 |
| JP | 10306534 | 2/1998 |
| WO | 9015082 | 12/1990 |
| WO | WO 94/13235 | 6/1994 |
| WO | 9417851 | 8/1994 |
| WO | WO9502616 | 1/1995 |
| WO | 9526699 | 10/1995 |
| WO | 9640304 | 4/1998 |
| WO | 9817215 | 4/1998 |
| WO | 9853768 | 12/1998 |
| WO | 9903454 | 1/1999 |
| WO | 9913923 | 3/1999 |
| WO | 9967320 | 12/1999 |
| WO | 0117574 | 3/2001 |
| WO | WO 01/19283 | 3/2001 |
| WO | 0177197 | 10/2001 |
| WO | WO01/77197 | 10/2001 |
| WO | WO 02/04570 | 1/2002 |
| WO | 0213871 | 2/2002 |
| WO | 02060501 | 8/2002 |
| WO | 02087642 | 11/2002 |
| WO | 02087645 | 11/2002 |
| WO | 03008007 | 1/2003 |
| WO | 03074099 | 9/2003 |
| WO | 03092359 | 10/2003 |
| WO | WO 03/082359 | 10/2003 |
| WO | 2004007651 | 1/2004 |
| WO | 2004029174 | 4/2004 |
| WO | 2004031253 | 4/2004 |
| WO | 2004047690 | 6/2004 |
| WO | 2004055057 | 7/2004 |
| WO | 2004060427 | 7/2004 |
| WO | 2004063388 | 7/2004 |
| WO | 2004064693 | 8/2004 |
| WO | 2004066704 | 8/2004 |
| WO | 2004069296 | 8/2004 |
| WO | 2004072138 | 8/2004 |
| WO | 2004093786 | 11/2004 |
| WO | 2005004943 | 1/2005 |
| WO | WO2005004943 | 1/2005 |
| WO | 2005035726 | 4/2005 |
| WO | WO 2005/030832 | 4/2005 |
| WO | WO2005030382 | 4/2005 |
| WO | 2006021054 | 3/2006 |
| WO | 2006091706 | 8/2006 |
| WO | 2007067697 | 6/2007 |
| WO | 2007015208 | 8/2007 |
| WO | WO 2008/144514 | 11/2008 |
| WO | 2009020793 | 2/2009 |
| WO | WO 2009/032430 | 3/2009 |
| WO | WO 2009/088654 | 5/2010 |

OTHER PUBLICATIONS

Noguchi et al., Poly(vinyl Alcohol) Hydrogel as an Artificial Articular Cartilage: Evaluation of Biocompatability. J. Applied Biomaterials, vol. 2, 101-107 (1991).

Hassan et al. "Structure and Applications of Poly(vinyl Alcohol) Hydrogels Produced by Conventional Crosslinking or by Freezing/Thawing Methods." Advances in Polymer Science, vol. 153, 2000.

Anseth et al. "In situ forming degradable networks and their application in tissue engineering and drug delivery." J. Controlled Release 78 (2002), 199-209, 2002.

Lin-Gibson et al. "Synthesis and Characterization of PEG Dimethacrylates and Their Hydrogels." Biomacromolecules 2004, 5, 1280-1287, 2004.

Peppas et al. Structure and Applications of Poly(vinyl alcohol) Hydrogels Produced by Conventional Crosslinking or b Freezing/Thawing Methods. Adv. Polymer Sci. 153, 37 (2000).

LeGeros R. Z., "Calcium phosphates in oral biology and medicine," Monograph in Oral Science, vol. 15, pp. 1-201.

Chow et al.,"Octacalcium Phosphate," Monograph in Oral Science, vol. 18, pp. 94-112 and 130-148.

Peppas et al. "Physicochemical Foundations and Structural Design of Hydrogels in Medicine and Biology." Ann. Rev. Biomed. Eng. 2, 9-29 (2000).

Hassan et al. "Cellular PVA Hydrogels Produced by Freeze/Thawing." J. Appl. Poly. Sci. 76, 2075 (2000).

Moro et. al. "Surface Grafting of Artificial Joints with Biocompatible Polymer for Preventing Periprosthetic Osteolysis." Nature Materials, 3, 829 (2004).

Hickey et al. :Solute Diffusion in Poly(vinyl)alchohol/poly(acrylic acid) composite membranes prepared by freezing/thawing techniques. Polymer 38, pp. 5931-5936 (1997).

Wang B., et al. The Influence of Polymer concentration on the Radiation-chemical Yield of Intermolecular Crosslinking of Poly(Vinyl Alcohol) by gamma-rays in Deoxygenated Aqueous Solution. Radiation Physics and Chemistry, 2000. 59: p. 91-95.
Rosiak, J. M. & Ulanski, P. Synthesis of hydrogels by irradiation of polymers in aqueous solution, Radiation Physics and Chemistry 1999 55: 139-151.
Stammen, J. A., et al. Mechanical properties of a novel PVA hydrogel in shear and unconfined compression Biomaterials, 2001 22: p. 799-806.
Yamaura, K., et al. Properties of gels obtained by freezing/thawing of poly(vinyl alcohol)/water/dimethyl sulfoxide solutions. Journal of Applied Polymer Science 1989 37:2709-2718.
Lozinsky, V. I. And Damshkaln, L. G. Study of cryostructuration of polymer systems. XVII. Poly(vinyl alcohol) cryogels: Dynamics of cryotropic gel formation. Journal of Applied Polymer Science 2000 77:2017-2023.
Oka M et al. "Development of artificial articular cartilage," Pro. Inst. Mech. Eng. 2000 214:59-68.
EP Search Report for EP 06256525.4 dated May 20, 2007.
Babb et al. "Perfluorcyclobutane Aromatic Ether Polymers. III. Synthesis and . . . " J. Applied. Polymer Sci., vol. 69, (1998), pp. 2005-2012.
Glossary of Basic Terms in Polymer Science published by IUPAC, Pure Appl. Chem., 68, 2287-2311 (1996).
EP Search Report for EP06256452.1 dated May 23, 2007.
ISR/WO for PCT/US2006/046725 dated Jul. 28, 2008.
Park K.R. et al. "Synthesis of PVA/PVP Hydrogels having Two-Layer by Radiation and their Physical Properties." Rad. Phys. and Chem., Jun. 2003, pp. 361-365. vol. 67, No. 3-4.
Hassan C.M. "Diffusional Characteristics of Freeze/Thawed Poly(vinyl alcohol) hydrogels: Applications to protein controlled release from multilaminate devices." Eur. J. Pharm. and Biopharm., 2000, pp. 161-165, vol. 49.
Bass L.S. "Laser Tissue Welding: A Comprehensive Review of Current and Future Clinical Applications," Lasers in Surgery and Medicine, 1995, pp. 315-349. vol. 17.
Search Report for PCT/US2008/071435 dated Feb. 2, 2009.
ISR/WO for PCT/US2007/064782 dated May 3, 2008.
ISR/WO for PCT/EP2005/010931 dated Feb. 16, 2006.
Carey et al., Adv. Org. Chem., Part B., p. 892, 2001.
Li et al. Anal. Biochem., 256, 130-132 (1998).
Rao et al. J. Chem. Soc. Dalton Trans., 2001, 1939-1944.
Bray, J.C. et al. "Poly(vinyl Alchoool) Hydrogels: Formation by Eelctron Beam Irradiation of Aqueous Solutions and Subsequent Crystallization." J. Applied Polymer Sci., vol. 17, pp. 3779-3794, 1973.
Bray, J.C. et al. "Poly(vinyl Alcohol) Hydrogels for Synthetic Articular Cartilage Material," Biomed. Mater. Res., vol. 7, pp. 431-443, 1973.
Kawanishi, K. Thermodynamic Consideration of the Sol-Gel Transition in Polymer Solutions. 35th Annual Meeting of the Society of Polymer Science, Japan 1986.
Lozinsky, V.I. et al. "Study of Cryostructures of Polymer Systems, XIV. Poly(vinyl alchohol) Cryogels: Apparent Yield of Freeze-Thaw Induced Gelation of Concentrated Aqueous Solutions of the Polymer." J. Applied Polymer Sci., vol. 77, 1822,1831 (2000).
Lozinsky, V.I. et al. "Study of Cryostructuration of Polymer Systems, XVII. Poly(vinyl alcohol) Cryogels: Dynamics of the Cryotropic Gel Formation." J. Appl. Polymer Sci., vol. 77, 2017-2023 (2000).
Lozinsky, V.I. et al. "Swelling Behavior of poly (vinyl alcohol) cryogels employed as matrices for cell immobilization." Enzyme Microb. Technol., vol. 18.
Peppas et al. "Reinforced Uncrosslinkable Poly (vinyl alcohol) gels produced by cyclic freezing-thawing processes: A Short Review." J. Controlled Release, 16 (1991), 305-310.
Mondino, A.V. et al. "Physical properties of gamma irradiated poly (vinyl alcohol) hydrogel preparations" Radiation Physics and chemistry, 55, p. 723,726 (1999).
Urushizaki, F. Swelling and Mechanical Properties of Poly (vinyl alcohol) Hydrogels. Intl. J. Pharma., 58, 135-142, 1990.
Lozinsky, V.I. "On the Possibility of Mechanodestruction of Poly (vinyl Alcohol) Molecules under Moderate Freezing of its Concentrated Water Solutions." Polymer Bulletin, 15, p. 333-340 (1986).

Yokoyama, F. "Morphology and Structure of Highly Elastic Poly (vinyl alcohol) Hydrogel Prepared by Repeated Freezing-and-Melting" Colloid & Polymer Sci. 264, 595-601 (1986).
Covert, R.J. et al. "Friction and Wear Testing of a New Biomaterial for Use as an Articular Cartilage Substitute," Bed 50 (2001), 355-356, Bioengineering Conference, ASME 2001.
Ding, Mei Yee. Characterisation of Polyvinyl Alcohol Hydrogels, 2003. Undergraduate Chemical Engineering Thesis, University of Queensland, Brisbane QLD 4072, Australia http://www.cheque.uq.edu.au/ugrad/theses/2003/pdf/CHEE4006/40054522/40054522.pdf (working link on Apr. 20, 2009).
Jaguar-Grodzinski, J. "Biomedical Application of Functional Polymers." Reactive and Functional Polymers 39 (1999) 99-138.
Ulanski, P. et al. "OH-Radical induced crosslinking and strand breakage of poly (vinyl alcohol) in aqueous solution in the absence and presence of oxygen. A pulse radiolysis and product study" Macromol. Chem. Phys. 195, p. 1443-14461 (1994).
Bryant, S.J. et al. "Crosslinking Density Influences Chondrocyte Metabolism in Dynamically Leaded Photocrosslinked Poly(ethylene glycol) Hydrogels." Ann. Biomed. Eng., Mar. 2004, pp. 407-417, vol. 3, No. 3.
Bryant, S.J. et al. "The Effects if Scaffold thickness on Tissue Engineered Cartilage in Photocrosslinked Poly (ethylene oxide) hydrogels." Biomaterials 22, 2001, pp. 619-628.
Bryant, S.J. et al. "Photocrosslinkable Poly(ethylene oxide) and Poly (vinyl alcohol) Hydrogels for Tissue Engineering Cartilage." 21st Annual Conference and the 1999 Annual Fall Meeting of the Biomedical Engineering Society, October 13-15, 1999, Atlanta, GA; Engineering in Medicine and Biology 1999, p. 751, vol. 2.
Durmaz, S. et al. "Phase Separation during the Formation of Poly(acrylamide) Hydrogels" Polymer 41, 2000, pp. 5729-5735.
Gong, J.P. et al. "Friction of Polymer Gels and the Potential Application as Artificial Cartilage." SPIE, Mar. 1999, pp. 218-225, vol. 3669.
Guilherme, R. et al. "Hydrogels based on PAAm network with PNIPAAm included: hydrophilic-hydrophobic transition measured by the partition of Organe II and Methylene Blue in Water." Polymer 44, 2003, pp. 4213-4219.
Hassan, C.M. et al. "Modeling of Crystal Dissolution of Poly(vinyl alcohol) gels produced by freezing/thawing processes." Polymer 41, 2000, pp. 6729-6739.
Hassan, C.M. et al. "Structure and Morphology of Freeze/Thawed PVA Hydrogels," Macromolecules, 2000, pp. 2472-2479, vol. 33, No. 7.
Hickey, A.S. et al. "Solute Diffusion in Poly(vinyl) alcohol/poly(acrylic) acid composite membranes prepared by freezing/thawing techniques." J. Memb. Sci. 107, 1995, pp. 229-237.
Kobayashi, M. et al. "Development of An Artificial Meniscus Using Polyvinyl alcohol-hydrogel for early return to, and continuance of, athletic life in sportspersons with severe meniscus injury." Abstract only, The Knee 10, 2003, p. 53.
Kobayashi, M. et al. "Preliminary Study of Polyvinylalcohol-hydrogel (PVA-H) artificial meniscus." Biomaterials 24, 2003, pp. 639-647.
Lester, C.L. et al. "Physical Properties of Hydrogels Synthesized from Lyotropic Liquid Crystalline Templates" Chem. Mater. 15, 2003, pp. 3376-3384.
Mano, V. et al. "Blends Composed of Poly(N-Isopropylacrylamide) and an Ethylene/Vinyl Alcohol Copolymer: Thermal and Morphological Studies" J. App. Polymer Sci., 2004, pp. 501-505.
Park, J.H. et al. "Hydrogels based on Poly(ethylene oxide) and poly (tetramethylene oxide) or poly)dimethyl siloxane). III. In vivo Biocompatability and Biostability." J. Biomed. Mater. Res. 64A, 2003, pp. 309-319.
Schmedlen, R.H. et al. "Photocrosslinkable polyvinyl alcohol hydrogels that can be modified with cell adhesion peptides for use in tissue engineering." Biomaterials, 23, 2002, pp. 4325-4332.
Suggs, L.J. et al. "In vitro Cytotoxicity and In Vivo Biocompatability of Poly(propylene fumarate-co-ethylene glycol) hydrogels." J. Biomed. Mater. Res., 1999, pp. 22-32, vol. 46.
Thomas, J.D. "Novel Associated PVA/PVDP Hydrogels for Nucleuc Pulposus Replacement." Thesis, Master of Science in Material Engineering Degree, Drexel University, Sep. 2001.

Ushio, K. et al. "Attachment of Artificial Cartilage to Underlying Bone." J. Biomed. Mater. Res. Part B: Appl. Biomater. 68B, 2004, pp. 59-68.

Ushio, K. et al. "Partial Hemiarthroplasty for the treatment of Osteonecrosis of the Femoral Head: An Experimental Study in the Dog." J. Bone Joint Surg., 2003, pp. 922-930, vol. 85B.

Zhang, X. et al. "Synthesis and Characterization of Partially Biodegradable, Temperature and pH Sensitive Dex-MA/PNIPAAm Hydrogels." Biomat., 25, 2004, pp. 4719-4730.

"Lecture 7: Hydrogel Biomaterials: Structure and Physical Chemistry," Spring 2003, 8 pages.

ISR/WO for PCT/US2006/006356 dated Jun. 22, 2006, 9 pages.

IPRP from PCT/US2008/071539, Mar. 2010.

IPRP from PCT/US2008/071435, Feb. 2010

Taguchi. Chemistry Letters, 711-712 (1998).

Lu et al. Journal of Controlled Release, 57, 291-300 (1999).

West et al. Reactive Polymers, 139-147 (1995).

Green et al. Organic Chemistry Principles and Industrial Practice. Wiley VCH, 2003.

Mondino et al. Rad. Chem. and Phys. 55, 723-726 (1999).

Jagur-Grodzinski in Reactive and Functional Polymers, 39, 99-139 (1999).

Tripathy et al. "Novel Flocculating Agent Based on Sodium Alginate and Acrylamide." European Polymer Journal. 35, 2057-2072 (1999).

Haralabakopoulus et al. J. Appl. Poly. Sci., 69, 1885-1890 (1998).

Preliminary Report on Patentability & Written Opinion for PCT/US2008/071539 dated Mar. 2, 2010, 6 pgs.

Hickey et al., "Mesh Size and Diffusive Characteristics Of Semicrystalline . . . ", Journal of Membrane Science 107 (1995) pp. 229-237.

PCT Notification of Transmittal of The ISR and The Written Opinion of the ISA, Or The Declaration for PCT Application No. PCT/US2008/083213 dated May 8, 2009, 13 pgs.

PCT Invitation To Pay Additional Fees for PCT Application No. PCT/US2006/046725 dated Apr. 22, 2008, 8pgs.

EP Search Report for 05001009.9-2115 dated Mar. 1, 2005, 3 pgs.

Preliminary Report & Written Opinion for PCT/US2008/086817 dated Jul. 15, 2010, 9 pgs.

LeGeros R. Z., "Calcium Phosphates In Oral Biology and Medicine," Monograph in Oral Science, vol. 15, pp. 1-201.

Chow et al., "Octacalcium Phosphate," Monograph in Oral Science, vol. 18, pp. 94-111 and 130-147.

Carey et al., Adv. Org. Chem., Part B., p. 829, 2001.

EP Examination Report for EP Application No. 05 806 343.9 dated Mar. 25, 2011 (4 pages).

* cited by examiner

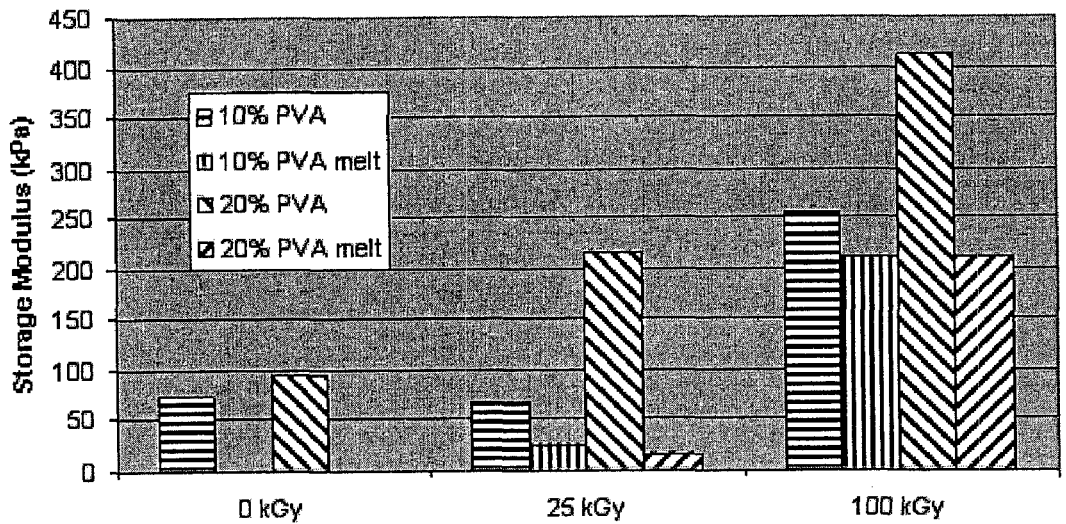
1 freeze-thaw cycle    Fig. 8
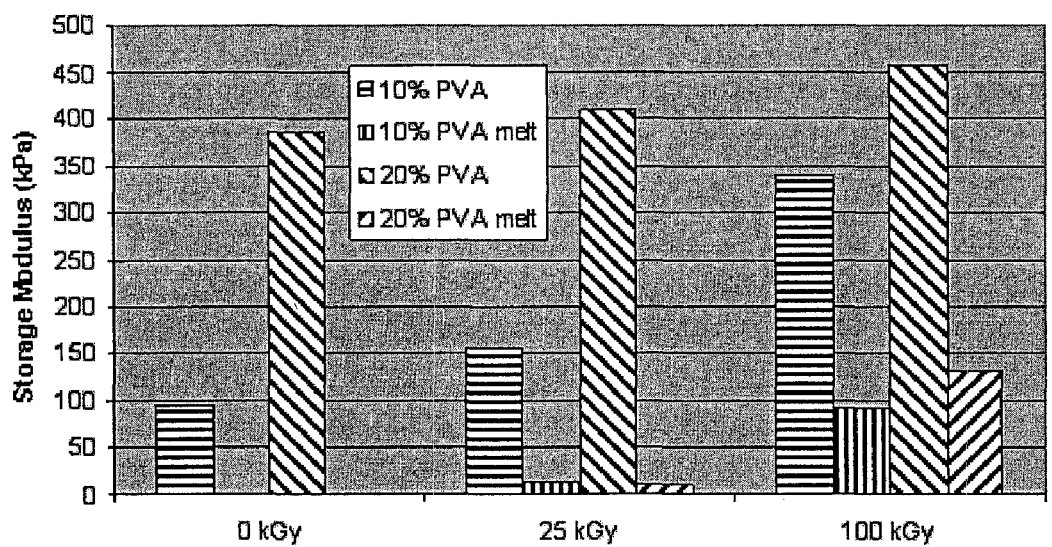
4 freeze-thaw cycles    Fig. 9

100 kGy / 1FT / PVA Coil

PVA HYDROGEL

The present application is a continuation of U.S. patent application Ser. No. 11/577,585, filed on Apr. 19, 2007, now abandoned, which was the National Stage of International Application No. PCT/EP2005/010931, filed Oct. 11, 2005, which claims the benefit of and priority to both U.S. patent application Ser. No. 10/962,975, filed Oct. 12, 2004,now U.S. Pat. No. 7,235,592, and EP Application Ser. No. 05001009.9, filed Jan. 19, 2005.

BACKGROUND OF THE INVENTION

Vinyl polymers are used in a variety of industrial applications. For example, poly vinyl alcohol (PVA) is a highly hydrophilic polymer that is used as sizing in the textile industry, as a base gel component for the cosmetics industry, as an adherent for the paper industry and as a general adhesive. The chemical formula of PVA is $(C_2H_4O)_n$ and the structural formula is $(-CH_2CH(OH)-)_n$.

It is widely known that PVA elicits little or no host biological response when implanted in animals. For this reason PVA is also used in a variety of biomedical applications including drug delivery, cell encapsulation, artificial tears, contact lenses, and more recently as nerve cuffs. PVA has generally not been considered for use as a load bearing biomaterial, primarily because of its low modulus and poor wear characteristics. It has been reported in the literature that hydrogel modulus and wear characteristics can often be enhanced by the formation of either chemical or physical associations. Cross-linking PVA by the addition of chemical agents such as polyaldehydes, through irradiation, or by freeze-thaw cycling, has been shown to improve the durability of PVA, wherein the last one forms physical associations and the other ones form chemical crosslinkings.

Use of PVA prepared by freeze-thawing methods has been suggested for use in biomedical applications as early as 1973. U.S. Pat. No. 3,875,302 issued to Taisei Inoue on Apr. 1, 1975 described a process of preparing gelled vinyl alcohol polymers by freezing an aqueous solution of a vinyl alcohol polymer below about −5 degrees Celsius and thereafter melting the frozen solution. The resulting product is named cryogel. This process of forming cryogels by freeze-thaw cycling was also described in a 1975 chemical engineering Ph.D. thesis by N. A. Peppas at the Massachusetts Institute of Technology (Cambridge, Mass.) and in U.S. Pat. No. 5,891,826. See also U.S. Pat. Nos. 4,472,542, 5,288,503 and 5,981,826; the entire contents of all cited references, patents and patent publications are incorporated by reference herein. Because of the slow dehydration exhibited by cryogels, they have been considered for use in contact lenses. PVA has also been considered for drug release applications, especially since the freeze-thaw process does not affect protein structure. Bioadhesive PVA gels have also been considered.

It is known that the exposure of aqueous solutions of PVA polymer to ionizing radiation can produce gels (Wang, B., et al. The Influence of Polymer Concentration on the Radiation-chemical Yield of Intermolecular Crosslinking of Poly(Vinyl Alcohol) by g-rays in Deoxygenated Aqueous Solution. Radiation Physics and Chemistry, 2000. 59: p. 91-95). Irradiation of PVA results in a chemical crosslinking of the polymer chains by the formation of covalent bonds. Hydrogels may be formed by irradiation of solid PVA polymer, PVA monomer (in bulk or in solution) or PVA polymer in solution. Irradiating a hydrophilic polymer in dry form is problematic for a variety of reasons, including the formation of unstable bonds and oxygen that cannot be fully removed. Additionally, the restricted motion of the polymer chains that bear the reactive free radicals limits the effectiveness of the cross-linking. In some hydrogels, it is possible to generate a cross-linked polymer solution by starting with pure monomer. Polymerization is performed first, followed by cross-linking, which is very convenient for many polymers. However, because of the instability of the PVA monomer, this is not a viable approach for making a PVA hydrogel. For most applications, crosslinking is conducted on polymer chains that are in solution, preferably in a deoxygenated solution.

To test the biocompatibility of PVA cryogels, Oka et al. implanted the PVA into rabbit patellar grooves and demonstrated little or no host tissue response. In further experimentation, small particles of the PVA hydrogel or UHMWPE controls, 50-300 microns in diameter, were implanted into the knee joints of wister rats. The UHMWPE induced a severe tissue response while the PVA did not induce a measurable response. The PVA was also bonded to a titanium fiber mesh which promoted bony in-growth when inset into the patellar grove of the femoral heads in rabbits. Thus, the combination titanium fiber mesh/PVA implant integrated into the joint and provided a reasonable bearing surface for joint loads.

The PVA had a low frictional coefficient when opposing articular cartilage (<0.1). Thus, it is likely that this biomaterial may be useful in hemi-arthroplasty (where wear against a hard surface is not an issue). To test the biocompatibility in this application, PVA backed with a titanium mesh was placed into the load bearing region of dog femoral condyles. The material was tolerated well and induced bony in-growth for fixation. The conclusion of Oka et al. is that this composite osteochondral device (COD), is ready for more extensive investigation as a partial articular surface replacement device.

The efficiency of a dose of gamma-radiation for crosslinking PVA in deoxygenated aqueous solution as a function of polymer concentration is shown in FIG. 1. Note that there is not only an ideal dose level, but also an optimal concentration of polymer where the efficiency of crosslinking is maximized (~30-300 $g/dm^3$). The peak in the crosslinking efficiency at approximately 300 $g/dm^3$ is due to increasing degradation (random scission) of the polymer chains at higher radiation doses.

The relationship between cross-linking and degradation can be understood by considering the case of irradiated solid PVA. The irradiation of solid PVA leads to main chain degradation as a result of ketone structure formation which is not due to an oxidation step via oxygen, but through keto-enol tautomerization. In keto-enol tautomerism, a simultaneous shift of electrons and a hydrogen atom occurs. Main chain scission can then occur in the backbone bearing the keto tautomer. Keto-enol degradation is thought to dominate when the concentration of the polymer limits chain movement and free radical mobility. Thus, as the concentration passes 300 $g/dm^3$, scission becomes more prevalent.

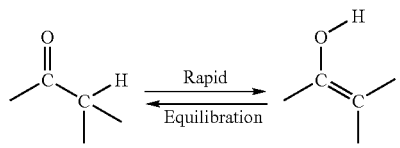

When ionizing radiation is applied to polymer chains in solution, reactive intermediates can be formed either by direct ionization, or indirectly by interaction with reactive intermediates (hydroxyl radicals) in the aqueous solution. In dilute solution, the indirect route dominates because of the electron fraction of the solution. Thus, for polymers in solution, the indirect route will be the primary mechanism responsible for the formation of reactive intermediates and subsequently, for the generation of crosslinks or scission. Because simple gel forming hydrophilic polymers do not have functional groups capable of efficient scavenging of free electrons, they do not participate in the formation of crosslinks extensively. The real workhorse is the hydroxyl radical in the aqueous solution. Nitrous oxide, which converts the free electrons to hydroxyl radicals, is sometimes added to polymer solutions undergoing radiation induced crosslinking to improve yield. Rosiak & Ulanski showed that the dependence of gelation dose (determined by rheology) on concentration was found to have a local minimum in the neighborhood of about 20 g/dm³ (FIG. 2, from Rosiak, J. M. & Ulanski, P., Synthesis of hydrogels by irradiation of polymers in aqueous solution, Radiation Physics and Chemistry 1999 55: 139-151). The method of crosslinking can by optimized by determining the local minimum in a corresponding gelation dose versus concentration curve for a given vinyl polymer and performing crosslinking in that range of irradiation doses.

tered macroradicals react with oxygen to form peroxyl radicals. The kinetics of this reaction are quite rapid (practically diffusion limited at a reaction constant of $10^9$ dm³/mol/sec). Even in a polyanionic gel, where oxygen approach is hindered by charge effects, the reaction constant is as high as $10^8$ dm³/mol/sec. When crosslinking with oxygen present it is important to note that neither the peroxyl nor the oxyl radicals form stable bonds upon recombination. Additionally, one of the main reaction pathways leads to chain scission (see Scheme 1 below). One method is to perform the irradiation in a sealed vessel. The oxygen present will be used up and gelation will occur. Sealed vessel irradiation has been utilized to produce hydrogel dressings. One could also irradiate in an open vessel and count on the diffusion limitation to slow the transport of oxygen from the surface. In this case, a high irradiation dose rate would be advantageous. It is also possible that a natural oxygen scavenger such as vitamin E would allow irradiation in an oxygen environment while minimizing chain scission.

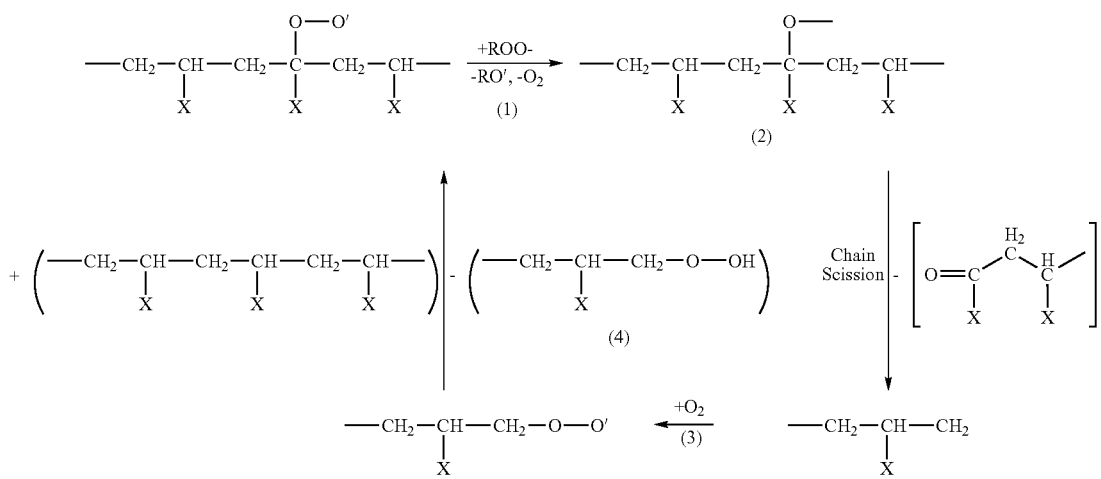

Scheme 1

In deoxygenated solutions, when chain break precursors are carbon-centered radicals localized at the main chain, the chain scission reactions are very slow because re-combination of radicals prevails. For non-ionic polymers like PVA, under normal irradiation conditions, chain scission yield is near zero if the concentration of polymer is low enough.

Additives can be used during the irradiation process to scavenge unwanted transient products (for example, tertbutanol scavenges OH— and nitrous oxide scavenges aqueous electrons). Other additives can help identify transient reaction products (tetranitromethane helps identify polymer radicals). Spin traps (2-methyl-2-nitrosopropane) allow EPR (or ESR) studies on short-lived species. Thiols are good H⁺ donors and are frequently used as polymer radical scavengers. Metal ions such as Fe(II) are also known to significantly affect the kinetics and yields of radiation-induced transformations of polyacrylic acid (PAA) (for example). Accordingly, all glassware should be carefully cleaned and even treated with complexing agents such as EDTA to remove traces of metal ions when working with polyelectrolyte gels. However, metal contamination should not cause problems when working with PVA.

Oxygen should also be considered an additive that must be carefully controlled. In oxygenated solutions, carbon cen- Physical Properties of Irradiated Poly(Vinyl Alcohol) Hydrogels Irradiated PVA films (⁶⁰Co gamma ray source, nitrogen atmosphere, dose-rate 0.0989 kGy/min, 86 kGy total dose; 10-15 wt % 78 kDa PVA in deionized water) had a tensile strength of 19.7 MPa and a strain of 609% on breaking. Compressive modulus obtained by dynamic mechanical analysis (DMA) on 10% solutions of PVA directly irradiated by electron beam in air (100 kGy total dose) yielded a 0.5 MPa storage modulus at 1 Hz. However, the samples were quite brittle.

Cross-Linking: Freeze-Thaw Cycling

Freeze/thaw cycling of PVA polymer in solution results in the formation of physical cross-linking (i.e. weak bonding through a nonpermanent "association" of the polymer chains). PVA hydrogels formed in this manner are thermoreversible and are termed "cryogels". In general, cryogels are solid elastomers containing over 80% water which are produced when solutions of higher molecular weight poly(vinyl alcohol) (PVA) of high degree of hydrolysis are subjected to one or more freeze-thaw cycles. Such cryogels are tough, slippery, elastomeric, resilient, insoluble in water below 50 degrees Celsius, and nontoxic.

Freeze-thaw cycling of solutions of PVA polymer results in the formation of physical associations (i.e. weak bonding through an "association" of the polymer chains). PVA hydrogels formed in this manner are termed "cryogels" and are described, for example, in U.S. Pat. Nos. 6,231,605 and 6,268,405, the entire contents of which are incorporated herein by reference. Importantly, the techniques utilized to create PVA cryogels do not require the introduction of chemical crosslinking agents or radiation. Cryogels are therefore easily produced with low impact on incorporated bioactive molecules. However, incorporated molecules are limited to those that can tolerate the freeze-thaw cycles required to make the gel. Thus the resulting material can contain bioactive components that will function separately following implantation. PVA cryogels are also highly biocompatible (as are PVA "thetagels," discussed below). They exhibit very low toxicity (at least partially due to their low surface energy), contain few impurities and their water content can be made commensurate to that of tissue at 80 to 90 wt %.

There is still some debate over the exact mechanism that drives the gelation of PVA through a freeze-thaw cycle. However, three models have been proposed to explain the physical crosslinking that occurs during the freeze-thaw cycle: 1) direct hydrogen bonding; 2) direct crystallite formation; and 3) liquid-liquid phase separation followed by a gelation mechanism. The first two steps suggest that the gel forms through a nucleation and growth (NG) phase separation, whereas the third option pictures the process as a spinodal decomposition (SD) phase separation. Hydrogen bonding will form nodes and crystallite formation will form larger polymer crystals. However both of these mechanisms will form closely connected crosslinks, with relatively small crosslinking nodes. This observation is supported by studies on the gelation mechanism of PVA. Spinodal decomposition on the other hand causes redistribution of the polymer into polymer rich and polymer poor regions followed by a gelation process which results in more distantly spaced crosslinks. It is thought that phase separation through spinodal decomposition is likely to be responsible for the improved mechanical properties of PVA after crosslinking and occurs due to a quenching of the polymer solution. During the freezing process, the system undergoes a spinodal decomposition whereby polymer rich and poor phases appear spontaneously in the homogeneous solution. This process occurs because the phase diagram of quenched PVA (and polymers in general) at certain temperatures can have two coexisting concentration phases. The polymer rich phases are therefore highly concentrated which enhances the natural (weak) gelation of the PVA.

For cryogels, the physical characteristics depend on the molecular weight of the uncrosslinked polymer, the concentration of the aqueous solution, temperature and time of freezing and the number of freeze-thaw cycles. Thus the properties of a cryogel can be modulated. However, since the material's properties change dramatically at every freeze-thaw step, control over the properties of the finished gel is somewhat limited. The thetagels described broaden the range of functionality currently provided by PVA cryogels.

In general, the modulus of the PVA cryogel increases with the number of freeze-thaw cycles. In one experimental series, thermally cycled PVA cryogels had compressive moduli in the range of 1-18 MPa and shear moduli in the range of 0.1-0.4 MPa (see Stammen, J. A., et al., Mechanical properties of a novel PVA hydrogel in shear and unconfined compression Biomaterials, 2001 22: p. 799-806).

As cryogels are crosslinked by physical and not chemical means, there is some concern about their structural stability. The modulus of PVA in aqueous solution increases with soak time in distilled water at constant temperature. In one experiment, conducted over 40 days, the modulus increased by 50%. Theoretically, during aqueous aging, the increase in strength, with the concomitant loss of soluble PVA, is the result of an increase in the order of the supramolecular packing of the polymer chains.

It is also important to understand the effects of loss of polymer over time and how that impacts the local host biological environment. It should be noted that in this example, the cryogel was only freeze-thaw cycled once, although others have shown PVA dissolution following multiple freeze-thaw cycles. In general, there is very little information about the stability of PVA cryogel modulus under repeated load cycling (fatigue).

As might be expected, the swelling of PVA cryogels at any time point decreases with increasing number of freeze-thaw cycles, indicating a densification of the PVA gel, most likely due to a higher crosslink density. In the long term, following gelation and under static conditions, the ultimate swelling ratio decreases while the modulus increases with time. In freeze-thaw processing, temperature is used to force a phase separation of the PVA solution, thus enhancing the gelation mechanism in the PVA (it should be noted that even at room temperature a solution of PVA begins to gel weakly over time).

When PVA in aqueous solution (or in aqueous/DMSO mixtures) is heated to dissolution and then frozen and thawed repeatedly, it forms a highly elastic gel. The sol-gel transition forms a physically (not chemically) crosslinked polymer. Thus, the crosslinking that is achieved is thermo-reversible. There is a dependence of the cryogel characteristics on the molecular weight of the uncrosslinked polymer, the concentration of the aqueous solution, temperature and time of freezing, the heating/cooling rates and the number of freeze-thaw cycles. Thus, there is a rich parameter space from which control of the mechanical properties of the PVA cryogels may be exercised. PVA cryogels exhibit very low toxicity (at least partially due to their low surface energy), contain few impurities and their water content can be made commensurate to tissue at 80 to 90 wt % and are thus generally considered to be fairly biocompatible.

Pores can increase in size with the number of freezing-thawing cycles. It is thought that the polyvinyl polymer is rejected from the ice crystals as an impurity and is progressively "volume excluded" into increasingly polyvinyl polymer rich areas. As might be expected, the pore size increases with decreasing concentration of polyvinyl polymer.

The melting point for freeze-thaw cycled cryogels in pure aqueous solutions is about 70-80° C. The melting point of a PVA cryogel in water/dimethyl sulfoxide (DMSO) solutions increases with the number of freeze thaw cycles. For a 10-30% concentration of DMSO in water, the melting point increased with an increase in freezing time. Quantifying the complex relationship between the melting point as a function of the freezing time, the concentration of DMSO, the concentration of the PVA and the number of freeze-thaw cycles is difficult. In general, the melting point increased with PVA concentration and with the number of freeze thaw cycles. In FIG. 3, the melting point variation as a function of PVA concentration and the number of freeze thaw cycles is shown for PVA in a 1% DMSO/water solution. FIG. 3 is a graphic illustration of the dependence of melting temperature on polymer concentration, with a family of curves for different numbers of freeze-thaw cycles for cryogels in 1 vol % DMSO at −40° C., where open circles represent data from gels treated with one cycle, closed circles represent data from gels treated with three cycles, open triangles represent data from gels treated with four cycles, closed triangles represent data from gels treated with eight cycles and open squares represent data from gels treated with fourteen cycles.

Because of the increased interaction between the PVA molecules and the solvent across a range of DMSO solvent concentrations (20-30% vol), the melting point of the PVA is extremely low (near or below 10° C.). In general, the melting point increases with the number of freeze/thaw cycles and increasing PVA concentration. At very high concentrations of DMSO (90%), the cryogels have a very low melting point and were transparent. After the first freeze/thaw cycle, the melting point does not change appreciably. The melting temperature of PVA cryogels in low concentration DMSO (1-5%) is independent of freezing time. However, the melting temperature of PVA in 30% DMSO is strongly dependent on freezing time. This dependence is probably due to retarded freezing in higher concentrations of DMSO. Faster freezing reduces the effects of crystal movement on the formation of cross-links. As a consequence, the melting point of PVA frozen quickly, and then held for longer periods of time (low concentration of DMSO) is lower than for PVA that does not freeze quickly (high concentration of DMSO). At higher concentrations of PVA, the melting point dependence on freezing time in higher concentration of DMSO is not as marked. However, the melting point is already very high for these samples. The highest melting points for PVA/DMSO/Water cryogels are found in gels that do not have frozen water in them during the "freeze" (40-80% DMSO).

Effect of Thawing Rate

Gel-fraction measurements of aqueous solutions of PVA demonstrate that slower thawing leads to less leachable polymer. The data corroborates the observation of a more efficient gelation process with decreasing thaw rates. The shear modulus of the hydrogel increases approximately linearly with decreasing log of the thawing rate (FIG. 4). FIG. 4 is a graphic illustration of the dependence of the shear modulus on the log of the thawing rate for PVA hydrogels formed by a single freeze-thaw cycle of 7 g/dl solution of PVA in water (data from Yamaura, K., et al., Properties of gels obtained by freezing/thawing of poly(vinyl alcohol)/water/dimethyl sulfoxide solutions. Journal of Applied Polymer Science 1989 37:2709-2718). Low thaw rates of 0.02° C./min generate cryogels with shear moduli of 10.55 kPa for a 10 g/dL concentration of PVA. No gelling occurred in samples thawed at 10° C./min. The loss of soluble polymer in aqueous media is decreased when the initial polymer concentration is high (~12 g/dL) provided that the thawing rate is low (~0.02° C./min).

Modulus

In general, the modulus of the PVA cryogel increases with the number of freeze-thaw cycles. The freeze-thaw effect has been exploited to generate PVA cryogels with fairly high moduli. In an experimental series aimed at determining whether PVA cryogels could be used in load bearing applications (i.e. cartilage), thermally cycled PVA cryogels had compressive moduli in the range of 1-18 MPa (at very high strain) and shear moduli in the range of 0.1-0.4 MPa. The material used in this series of experiments is Salubria™ (available from SaluMedica, Atlanta, Ga.).

Modulus Stability.

Due to the thermoreversible nature of cryogels there has been concern in the literature about the stability of the crosslinks. It has been observed that the modulus of non-cryogel PVA in aqueous solution increases with soak time in distilled water at a constant temperature. In one experiment, conducted over 40 days, the modulus increased 1.5 times. It is possible that during aqueous aging, the increase in strength with the concomitant loss of soluble PVA is the result of an increase in the order of the supramolecular packing of the polymer chains; in other words, even at moderate temperatures, there is a weak gelation process. There are significant implications in these data for long term storage of freeze-thaw gelled PVA. It is also important to understand the effects of loss of polymer over time and how that impacts the local host biological environment.

Swelling.

As might be expected, the swelling of PVA cryogels at any time point decreases with increasing number of freeze-thaw cycles, while the storage modulus of PVA increases with the number of freeze-thaw cycles. However, following gelation and under static conditions, the ultimate swelling ratio decreases while the modulus increases with time. These observations are consistent with the theory of residual soluble polymer leaching out, proposed by Lozinsky et al. The swelling dynamics of PVA cryogels typically obey the square root law (swelling ratio vs immersion time) that is characteristic of a diffusion process.

PVA gels may also be produced through thermal cycling (not necessarily with freezing) with dehydration. Such gels are potentially suitable for use in load bearing applications, specifically, for use as an artificial articular cartilage. In such applications, an artificial cartilage can be made from PVA with a high degree of polymerization (7000), which translates to an average molecular weight of 308,000 g/mol. To generate high modulus PVA from this polymer, the polymer powder is dissolved in a mixture of water and DMSO. The solution is cooled to below room temperature to obtain a transparent gel. The gel is then dried using a vacuum dehydrator for 24 hours at room temperature and then heat treated in a silicone oil bath for 1 hour at 140° C. The PVA is placed in water until maximum hydration is achieved. The water content can be controlled by varying the annealing, or heat-treating, process. The resulting PVA hydrogel can have a water content of approximately 20%, which is low.

Examination of the material properties of this thermally cycled PVA found that the material distributes stress more homogeneously than stiff biomaterials (UHMWPE) and preserves the lubrication film gap readily in simulated articular cartilage loading. The material sustained and distributed pressure in the thin film of between 1 and 1.5 MPa. In transient load tests, the PVA withstood and distributed loads of nearly 5 MPa (FIG. 5). FIG. 5 is a graphic illustration of the time course of transient stresses transmitted through samples (mass=27 N) of various materials dropped from a height of 10 mm, where curve 1 is polyethylene, curve 2 is subchondral bone with articular cartilage, curve 3 is subchondral bone without articular cartilage, and curve 4 is a 20% aqueous PVA hydrogel; data are from Lozinsky, V. I. and Damshkaln, L. G., Study of cryostructuration of polymer systems. XVII. Poly (vinyl alcohol) cryogels: Dynamics of cryotropic gel formation. Journal of Applied Polymer Science 2000 77:2017-2023.

Oka and colleagues further examined the wear properties of thermally cycled PVA under a variety of conditions (Oka, M. et al., Development of artificial articular cartilage, Pro. Inst. Mech. Eng. 2000 214:59-68). The wear factor found in unidirectional pin-on-disk (against alumina) experiments is comparable to that of UHMWPE. However, in reciprocating tests, the wear factor is up to 18 times larger. To improve the wear properties, PVA of even higher molecular weight and cross-linked by -radiation (doses over 50 kGy) were used. Such treatment reduces the wear factor considerably (to about 7 times that of UHMWPE).

All vinyl polymer hydrogels known in the state of the art are either only physically crosslinked resulting in an instability of material when heated over the melting point of the physical associations or only chemically crosslinked in solution having the disadvantage that the arrangement of the crosslinks of the resulting product can only be badly regulated. Therefore, there was the need to provide vinyl polymer hydrogels that have the advantages of covalently crosslinked polymers, wherein the arrangement of the chemical crosslinks exhibits specific physical properties that could be designed/taylor-made according to the requirements of the field of application.

SUMMARY OF THE INVENTION

The present invention provides methods of making covalently crosslinked vinyl polymer hydrogels having advantageous physical properties. In other embodiments, the present invention provides covalently crosslinked vinyl polymer hydrogel compositions made by a method of the present invention. In further embodiments, the present invention provides articles of manufacture comprising covalently crosslinked vinyl polymer hydrogel compositions made by a method of the present invention. Surprisingly, it was found that the covalently crosslinked vinyl polymer hydrogels according to the present invention can be made translucent, preferably transparent, or opaque depending on the processing conditions. As far as transparency of the resulting polymer is concerned, the transparency is dependent from the remaining physical associations in the product, i.e. the more physical associations of the chemical crosslinked vinyl polymer hydrogel are removed, the more transparency could be achieved. The stability of the physical properties of the produced vinyl polymer hydrogel can be enhanced by controlling the amount of covalent crosslinks. Moreover, it was found that according to the methods of the present invention it is possible to maintain the shape/mold of the precursor gel during the whole process, wherein also vinyl polymer hydrogels may be produced which exhibit a memory of shape (see e.g. FIG. 12, the coiled PVA hydrogel). Following the removal of the physical associations, the resulting vinyl polymer hydrogel exhibits chemical crosslinks having a very similar, but "inversed" pattern in comparison to the former physical associations, i.e. the physical associations are lost and at their former places there are no crosslinks anymore. Due to the fact that only amorphous regions can crosslink, by removing the physical associations the resulting pattern will be similar but sort of inversed. Furthermore, according to the present invention, it is possible to produce vinyl polymer hydrogels with gradient or sharp changes in covalent crosslinking using e.g. gradient shields or discrete uniform shielding materials during the radiation step.

According to the invention, a covalently cross-linked vinyl polymer hydrogel is produced by a.) providing a physically associated vinyl polymer hydrogel having a crystalline phase; b.) exposing said physically associated vinyl polymer hydrogel to ionizing radiation providing a radiation dose effective to form covalent crosslinks, and c.) removing at least a part, preferably about 1% to 100%, of the physical associations by the feed of an amount of energy sufficient to break the physical associations to be removed.

Thus, the invention is based on the surprisingly simple idea of forming covalent crosslinks through irradiation of a previously produced "crystalline" hydrogel and then—removing the physical associations responsible for the crystalline phase so that—preferably—only or predominantly the covalent crosslinks remain.

Preferably, the step of providing a physically associated vinyl polymer hydrogel having a crystalline phase according to step a.) includes the steps of a1.) providing a vinyl polymer solution comprising a vinyl polymer dissolved in a solvent; a2.) heating the vinyl polymer solution to a temperature elevated above the melting point of the physical associations of the vinyl polymer; a3.) inducing gelation of the vinyl polymer solution; and a4.) optionally controlling the gelation rate to form crystalline physical associations in the vinyl polymer hydrogel.

The gelation of steps a3.) and a4.) may be performed by subjecting the vinyl polymer solution to at least one freeze-thaw cycle and/or mixing the vinyl polymer solution with a gellant, wherein the resulting mixture has a higher Flory interaction parameter than the vinyl polymer solution and/or dehydrating the vinyl polymer solution.

The ionizing radiation of step b.) may be performed using gamma radiation and/or beta particles, wherein the radiation dose is typically in the range of about 1-1,000 kGy, preferably about 50-1,000 kGy and more preferably about 10-200 kGy. The radiation dose rate is preferably in the range of about 0.1-1000 kGy/min, more preferably about 0.1-25 kGy/min and most preferably about 1-10 kGy/min. As radiation, gamma radiation or beta particles can be used. In another preferred embodiment, the radiation dose is within 20% of the optimum radiation dose, preferably within 10% of the optimum radiation dose and most preferably within 7% of the optimum radiation dose. The optimum radiation dose is a function of the actual polymer, solvent and concentration configuration and thus specific for a certain gel. This will also be discussed further below.

As far as the radiation step of step b.) is concerned, a radiation mask can be used to manipulate the degree of radiation dose in order to produce vinyl polymer hydrogels exhibiting a gradient in the crosslinkage. Said radiation mask may be a step mask and/or a gradient mask.

The energy of step c.) can be fed by exposing the irradiated vinyl polymer hydrogel to a temperature above the melting point of the physically associated crystalline phase and/or the energy can be fed by electromagnetic radiation, in particular microwave radiation, and/or ultrasonic. The quantity of the energy required for breaking a certain part of the existing physical associations may be determined by the heat of linkage of a single bonding, i.e. physical association multiplied with the number of associations to be broken. Therefore, other energy sources delivering energy to the vinyl polymer hydrogel to break the physical associations are suitable as well.

The use of microwave radiation has the advantage that the energy is effective within the complete hydrogel and not only at its surface. Thus, the required amount of energy can be controlled very accurately.

A preferred vinyl polymer of the invention is selected from the group consisting of poly(vinyl alcohol), poly(vinyl acetate), poly(vinyl butyral), poly(vinyl pyrrolidone) and any mixture thereof.

Whenever in the methods of the present invention a solvent is needed or used, a polar solvent is preferred. In a more preferred embodiment the vinyl polymer of step c.) is immersed in a polar solvent during the feed of energy. Said polar solvent may be a polar solvent known to a person skilled in the art, preferably the polar solvent is selected from the group consisting of water, preferably deionized water, methanol, ethanol, dimethyl sulfoxide and any mixture thereof.

Preferably, the vinyl polymer, in particular the vinyl polymer of step a1 mentioned above (i.e. so to speak the "starting material"), has the following properties:

In a further embodiment of the present invention, the vinyl polymer is highly hydrolyzed and/or has a molecular weight of about 15 kg/mol to about 15,000 kg/mol. Preferably, the vinyl monomer is vinyl alcohol, vinyl acetate, vinyl butyral, vinyl pyrrolidone and/or any mixture thereof. More preferably, the vinyl polymer is a, preferably highly hydrolyzed, poly(vinyl alcohol) of about 50 kg/mol to about 300 kg/mol molecular weight, preferably of about 100 kg/mol molecular weight. Alternatively, the vinyl polymer can be a, preferably highly hydrolyzed, poly(vinyl pyrrolidone) of about 1,000 kg/mol to about 1,500 kg/mol molecular weight.

Further, the vinyl polymer has a degree of hydrolysis of about 70 to about 100 percent, preferably about 95 to about 99.8 percent. Preferably, the vinyl polymer is a poly(vinyl alcohol) having a degree of hydrolysis of about 80 to about 100 percent, preferably about 95 to about 99.8 percent.

Further, the vinyl polymer has a degree of polymerization of about 50 to about 200,000, preferably about 1,000 to about 20,000. Preferably, the vinyl polymer is a poly(vinyl alcohol) having a degree of polymerization of about 100 to about 50,000, preferably about 1,000 to about 20,000.

The vinyl polymer solution can be about 0.5 to about 80 weight percent, preferably about 1 to about 15 weight percent, more preferably about 10 to about 20 weight percent solution of the vinyl polymer based on the weight of the solution. Preferably, the vinyl polymer solution is about 0.5 to about 50 weight percent, preferably about 1 to about 15 weight percent, more preferably about 10 to about 20 weight percent solution of poly(vinyl alcohol) based on the weight of the solution.

Moreover, the present invention provides a covalently crosslinked vinyl polymer hydrogel produced by the methods according to the present invention as well as an article of manufacture comprising the covalently crosslinked vinyl polymer hydrogel of the present invention. In a further preferred embodiment the article of manufacture is selected from a device for delivery of active agents, a load bearing orthopedic implant, a bandage, a trans-epithelial drug delivery device, a sponge, an anti-adhesion material, an artificial vitreous humor, a contact lens, a breast implant, a stent and non-load-bearing artificial cartilage.

In another preferred embodiment, the covalently crosslinked vinyl polymer hydrogel produced by the methods according to the present invention is used as coating material, especially in the medical and cosmetic area, preferably medical devices and implants.

Within this application, thermoreversible means a characteristic of the vinyl polymer. Whether a hydrogel is formed by the freeze-thaw technique or the solvent manipulation approach, in both cases if the formed hydrogel, lacking any additional covalent bond formation from irradiation, is raised above the melting point of the respective physical associations (around 30 to 150° C., preferably 50 to 100° C., more preferably around 80° C.), the hydrogel returns into solution and does not reform, even when cooled to room temperature.

Cryogel means a vinyl polymer gel formed by one or more cycles of cooling a vinyl polymer solution down, followed by returning to a temperature below the melting point of the gel, e.g. a vinyl polymer gel formed following freeze-thaw cycling.

Thetagel means a vinyl polymer gel made by a process that includes a step of mixing the vinyl polymer solution with a gellant, wherein the resulting mixture has a higher Flory interaction parameter than the vinyl polymer solution.

Radiogel refers to a vinyl polymer gel in which irradiation has been used to form covalent bonds between adjacent vinyl polymer chains having physical associations, followed by an optional step of heating the vinyl polymer gel above the melting point of the physical associations within the crystalline phase of the vinyl polymer gel.

Precursor gel means the gel before the radiation step, which is defined by specific parameters, like a certain concentration, degree of polymerization of the vinyl polymer as well as a certain amount of physical associations.

Gelling means the formation of a 3-dimensional macroscale network from a solution of the vinyl polymer.

Swelling is the increase in volume produced when a formed gel is placed in a good solvent for the gel. The gel swells to a degree depending on the quality of the solvent and the degree of network formation (crosslink density) of the hydrogel.

Crystalline phase refers to the formation of physical associations and/or crystalline structures in vinyl polymers. It is believed that the crystalline regions are formed by forcing the vinyl polymer chains into close proximity, thereby allowing the chains to form physical associations. These physical associations form the network of the vinyl polymer hydrogel and hold it together. As noted above, three models have been proposed to explain formation of said physical associations: 1) direct hydrogen bonding; 2) direct crystalline formation; and 3) liquid-liquid phase separation followed by a gelation mechanism. Within this application, crystalline phase is defined as physical association within the vinyl polymer accomplished by at least one of said three possible interactions, preferably the direct crystalline formation.

The physical properties of the produced hydrogel can be adjusted by varying controlled parameters such as the proportion of physical associations, the concentration of polymer and the amount of radiation applied. Such covalently crosslinked vinyl polymer hydrogels can be made translucent, preferably transparent, or opaque depending on the processing conditions. The stability of the physical properties of the produced vinyl polymer hydrogel can be enhanced by controlling the amount of covalent crosslinks. At least a part of the physical associations are removed. Preferably the fraction of physical associations removed ranges from about one tenth to substantially all of the physical associations. In other preferred embodiments, about 1-100%, preferably 10-90%, most preferably 20-80% of the physical associations are removed.

In accordance with a preferred embodiment, the method of manufacturing a covalently crosslinked vinyl polymer hydrogel includes the steps of providing a vinyl polymer solution comprising a vinyl polymer dissolved in a solvent; heating the vinyl polymer solution to a temperature elevated above the melting point of the physical associations of the vinyl polymer, inducing gelation of the vinyl polymer solution; controlling the gelation rate to form crystalline physical associations in the vinyl polymer hydrogel, exposing the physically associated vinyl polymer hydrogel to a dose of ionizing radiation of about 1-1,000 kGy effective to produce covalent crosslinks and melting the vinyl polymer hydrogel in a solvent to remove substantially all or a fraction of the physical associations. In some preferred embodiments, the produced covalently crosslinked vinyl polymer hydrogel substantially lacks physical associations.

The desired physical property typically includes at least one of light transmission, gravimetric swell ratio, shear modulus, load modulus, loss modulus, storage modulus, dynamic modulus, compressive modulus, crosslinking and pore size.

In preferred embodiments, light transmission is increased sufficiently to make the resulting hydrogel translucent. In more preferred embodiments, light transmission is increased sufficiently to make the resulting hydrogel transparent. In PVA hydrogels, as with most polymers, crystallinity is always accompanied by opacity, due to the size of the crystalline structure (10-100 nm) and its difference in refractive index from amorphous PVA. Once the crystalline junctions are melted following irradiation, the local ordering is lost as the crystals melt, resulting in a loss in opacity. The covalent bonds hold the chains together at the previous crystalline junction points, but do not impose any ordering, In preferred embodiments, the vinyl polymer is selected from the group consisting of poly(vinyl alcohol), poly(vinyl acetate), poly(vinyl butyral), poly(vinyl pyrrolidone) and a mixture thereof. Preferably the vinyl polymer is highly hydrolyzed poly(vinyl alcohol) of about 50 kg/mol to about 300 kg/mol molecular weight. In preferred embodiments, the vinyl polymer is highly hydrolyzed poly(vinyl alcohol) of about 100 kg/mol molecular weight. Typically the vinyl polymer solution is about 0.5-50 weight percent solution of poly(vinyl alcohol) based on the weight of the solution. In certain preferred embodiments, the vinyl polymer solution is about 1-15 weight percent. In other preferred embodiments, the vinyl polymer solution is about 10-20 weight percent polyvinyl alcohol. The vinyl polymer, preferably poly(vinyl alcohol), can be isotactic, syndiotactic or atactic.

The solvent of the vinyl polymer solution is selected from the group consisting of polar solvents, preferably e.g. water, preferably deionized water (DI), methanol, ethanol, dimethyl sulfoxide and a mixture thereof. The solvent used in melting the vinyl polymer hydrogel to remove the physical associations is selected from the group consisting of polar solvents, preferably e.g. water, preferably deionized water, methanol, ethanol, dimethyl sulfoxide and a mixture thereof. In preferred embodiments, the same solvent is used for the vinyl polymer solution and for melting the vinyl polymer hydrogel to remove the physical associations. In preferred embodiments, the ionizing radiation is gamma radiation or beta particles (electron beam). In preferred embodiments, the total radiation dose is suitably 1-1,000 kGy, preferably 50-1,000 kGy, more preferably 10-200 kGy. The radiation dose rate is suitably about 0.1-25 kGy/min, preferably about 1-10 kGy/min. In preferred embodiments, the irradiation dose used is within 20% of the optimum irradiation dose, preferably within 10%, more preferably within 7% of the optimum irradiation dose. The optimum irradiation dose is specific to each polymer.

In preferred embodiments, the suitable polymer concentration of the hydrogel product to be irradiated can be optimized within the polymer concentration range flanking the maximum of a plot of intermolecular crosslinking yield v. polymer concentration or the minimum of a plot of irradiation dose v. polymer concentration, i.e. the point at which the slope of the plot is zero. Suitably, the polymer concentration falls in a range in which the intermolecular crosslinking yield or the irradiation dose is within 20% of the maximum or minimum value, respectively, preferably within 10%, more preferably within 7% of the value. Where the hydrogel comprises poly(vinyl alcohol), the hydrogel is suitably about 2 to about 35 weight percent poly(vinyl alcohol), preferably about 3.5 to about 30 weight percent poly(vinyl alcohol), more preferably about 5 to about 25 weight percent poly(vinyl alcohol), based on the weight of the composition.

After irradiation, the physical associations are removed by raising the temperature of the hydrogel above the melting point of the thermo-reversible physical associations. The required temperature depends on the melting point of the cross-links and is suitably about 0-100 degrees Celsius, preferably about 40-80 degrees Celsius. Preferably the irradiated gels are heated to high temperatures while they are immersed in solvent to allow dissolution and elution of the PVA chains "melted out" of the physical associations. The duration of the exposure to the elevated temperature can be adjusted to melt out all of the physical associations, or just a fraction of the physical associations.

The covalently crosslinked vinyl polymer hydrogels of the present invention have an advantageous inherent material stability that is exhibited when the crosslinking is covalent chemical rather than physical. Forming covalent crosslinks by radiation rather than by chemical reagents avoids the potential problem of residual contaminants. For medical materials and articles of manufacture, both the irradiation and the sterilization steps can be performed simultaneously, simplifying manufacturing and reducing costs. The ability to control pore size by varying the degree of precursor gel physical crosslinking will be an advantage over other means of forming covalent vinyl polymer hydrogels. In certain embodiments, pore size can be tailored to facilitate the population of the hydrogel by a desired class of cells, such as chondrocytes or fibroblasts.

The methods are applicable to the creation of materials for use in medical, biological and industrial areas including the controlled delivery of agents (which may include proteins, peptides, polysaccharides, genes, DNA, antisense to DNA, ribozymes, hormones, growth factors, a wide range of drugs, imaging agents for CAT, SPECT, x-ray, fluoroscopy, PET, MRI and ultrasound), generation of load bearing implants for hip, spine, knee, elbow, shoulder, wrist, hand, ankle, foot and jaw, generation of a variety of other medical implants and devices (which may include active bandages, trans-epithelial drug delivery devices, sponges, anti-adhesion materials, artificial vitreous humor, contact lens, breast implants, stents and artificial cartilage that is not load bearing (i.e., ear and nose)), any application where gradients (single or multiple) in mechanical properties or structure are required. The hydrogels of the present invention can also be used as a biocompatible coating for implanted objects, such as radio frequency identification (RFID) devices and orthopedic prostheses.

The foregoing and other features and advantages of the system and method for PVA hydrogels will be apparent from the following more particular description of preferred embodiments of the system and method as illustrated in the accompanying drawings in which like reference characters refer to the same parts throughout the different views.

BRIEF DESCRIPTION OF THE DRAWINGS

FIG. 8 is a graphic illustration of the results of dynamic mechanical analysis of 10-20 weight percent aqueous PVA hydrogels ($10^5$ g/mole, 93%+hydrolyzed) cast as thin (4 mm) sheets and subjected to one freeze-thaw cycle by immersion in a NaCl/ice bath at −21 degrees Celsius for eight hours and then allowing them to thaw at room temperature for four hours in accordance with a preferred embodiment of the present invention. The samples were then irradiated in a hydrated state to 0, 25, or 100 kGy with an electron beam. Some of the resultant gels were then raised to 80° C. to melt the crystals generated by the freeze-thaw cycle. Dynamic mechanical analysis was conducted at 37° C. at 1 Hz in distilled water. Group 1-control (0 kGy), Group 2-25 kGy, Group 3-100 kGy. The drop in storage modulus for the "melt" samples is ascribed to the loss of thermally reversible physical associations due to freeze thawing. No melt data is shown for the 0 kGy irradiated samples since these materials completely disassociated upon melting.

FIG. 9 is a graphic illustration of the results of dynamic mechanical analysis of 10-20 weight percent aqueous PVA hydrogels ($10^5$ g/mole, 93%+hydrolyzed) cast as thin (4 mm) sheets and subjected to four freeze-thaw cycles by immersion in a NaCl/ice bath at −21 degrees Celsius for eight hours and then allowing them to thaw at room temperature for four hours in accordance with a preferred embodiment of the present invention. The samples were then irradiated in a hydrated state to 0, 25, or 100 kGy with an electron beam. Some of the resultant gels were then raised to 80° C. to melt the crystals generated by the freeze-thaw cycle. Dynamic mechanical analysis was conducted at 37° C. at 1 Hz in distilled water. Group 1—control (0 kGy), Group 2—25 kGy, Group 3—100 kGy. The drop in storage modulus for the "melt" samples is ascribed to the loss of thermally reversible physical associations due to freeze thawing. No melt data is shown for the 0 kGy irradiated samples since these materials completely disassociated upon melting.

Irradiated hydrogels of the present invention can show a "memory" of their original form, returning to the original form when released from constraint.

Figure 12:
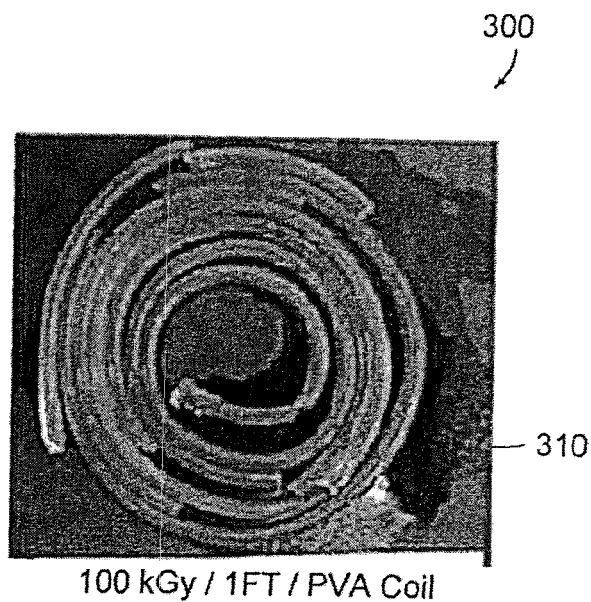

FIG. 12 shows a coil 300 formed of a PVA hydrogel 310 comprising 10% PVA showing retention of the coiled form after the melting-out of physical associations. Solutions of poly(vinyl alcohol) ($10^5$ g/mole; 93%+hydrolyzed) were prepared in water to concentrations of 10 wt. %. The solutions were poured into flexible tubing with interior diameters of 0.25". The ends of each piece of tubing were sealed, the tubes were coiled into a spiral, and the spirals were subjected to one freeze-thaw cycle by immersing in an NaCl/ice bath at −21° C. for 8 hours and then allowing them to thaw at room temperature for four hours. The samples were then irradiated in a hydrated state to 100 kGy with an electron beam. Some of the resultant coiled gels were then raised to 80° C. to melt the freeze-thaw generated associations. The coiled gels could be stretched into a straight rod, but resumed their coiled state upon release of the applied tension.

Suitably sized coils can be inserted through a cannula or lumen of an equivalent delivery device into an enclosed space and then resume their preformed shape following expulsion into the enclosed space from the delivery device. In one embodiment, a coiled gel of the present invention can be inserted into the center of an intervertebral body to replace a nucleus pulposus. In other embodiments, preformed hydrogel coils can be used to fill voids in reconstructive surgery. In other embodiments, preformed hydrogel coils can be used as wound dressings. The space-filling characteristics of such hydrogel coils can be advantageously combined with the use of the hydrogel material of the present invention as a depot of a releasable active agent. The skilled artisan will recognize that the preformed shape that can be "remembered" by the hydrogels of the present invention is not limited to a coil.

Figure 13:
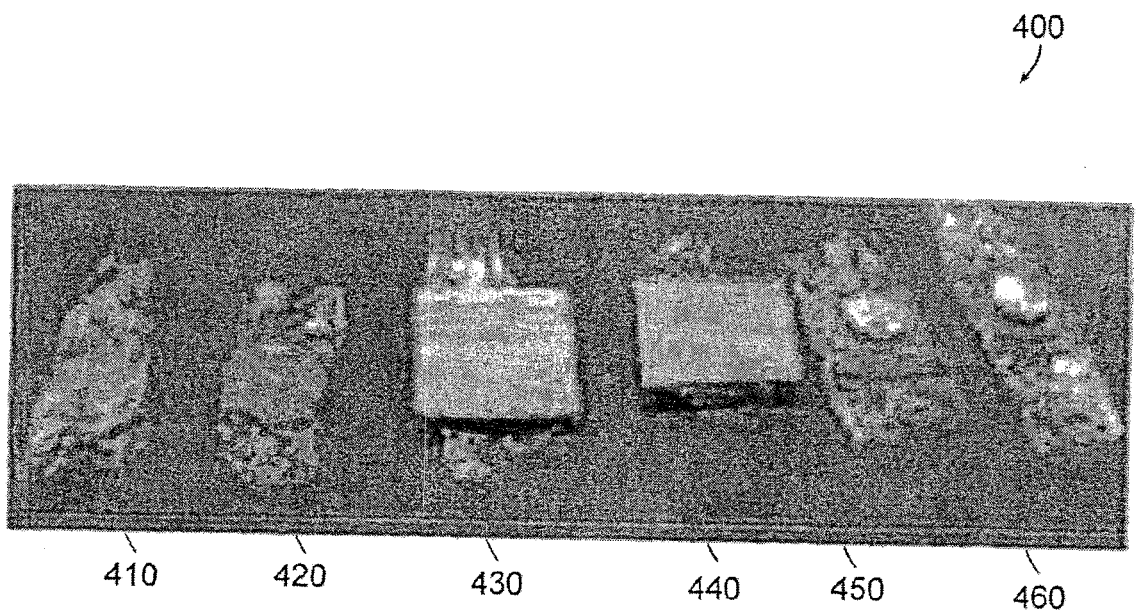

FIG. 13 shows an array 400 of packaged PVA disks about to undergo electron beam irradiation where disks 410, 420 received no shielding, disks 430, 440 received gradient shielding and disks 450, 460 received stepped shielding.

Figure 14A:
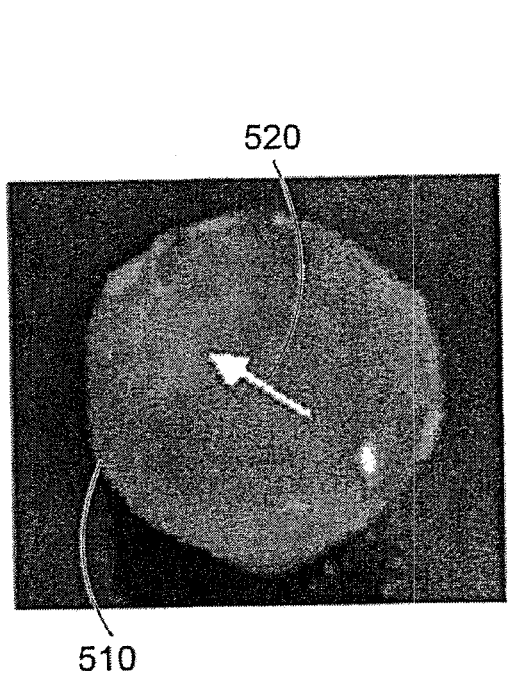
Figure 14B:
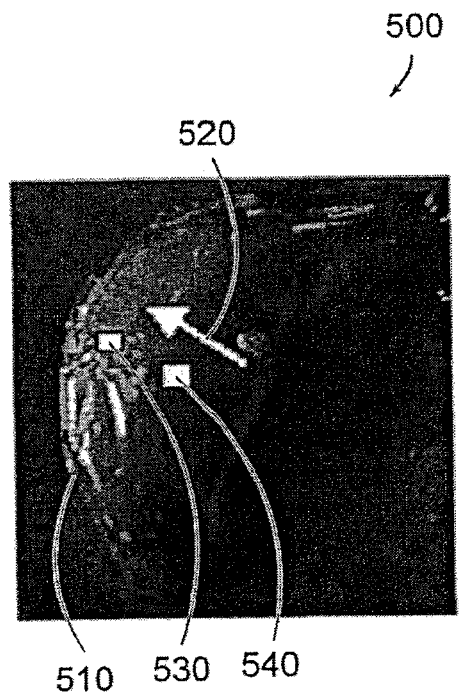

FIGS. 14A and 14B are an illustration 500 showing the effects of irradiation using a continuous gradient mask. FIG. 14A shows a continuous gradient PVA hydrogel 510 formed by a single freeze-thaw cycle and then irradiated in a hydrated state to 100 kGy with an electron beam prior to melt-out. The arrow 520 points in the direction of increasing covalent crosslinks (higher received dose). FIG. 14B shows the same continuous gradient PVA hydrogel 510 shown in FIG. 14A following melt-out having the arrow 520 pointing in the direction of increasing covalent crosslinks (higher received dose), where the boxes 530, 540 indicate the locations where the swelling ratio was assessed. Note the increase in transparency following melt-out of physical associations.

Figure 15A:
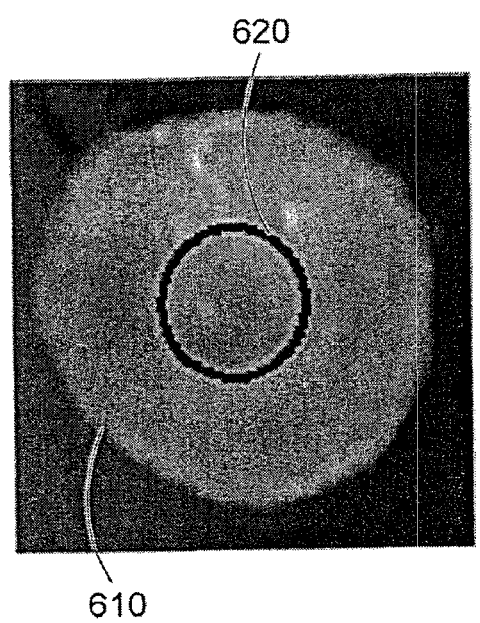
Figure 15B:
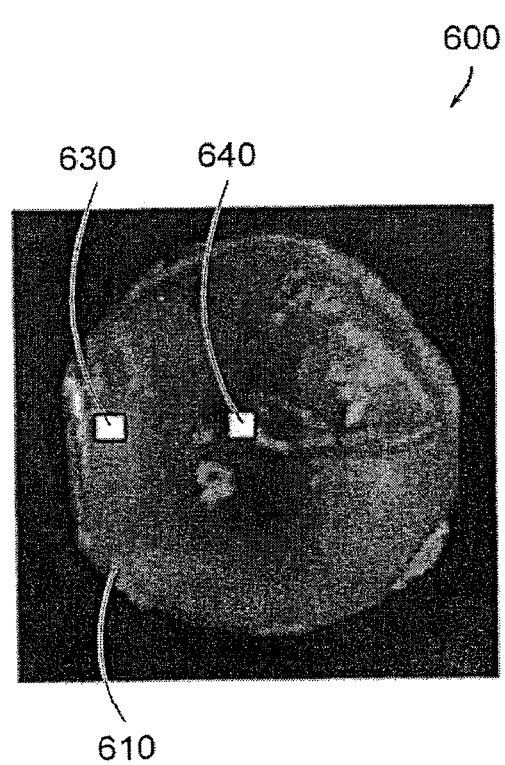

FIGS. 15A and 15B are an illustration 600 showing the effects of irradiation using a stepped gradient mask. FIG. 15A shows a stepped gradient PVA hydrogel 610 formed by a single freeze-thaw cycle and then irradiated in a hydrated state to 100 kGy with an electron beam prior to melt-out. The circle 620 indicates the position during irradiation of the mask (an aluminum disk). FIG. 15B shows the same stepped gradient PVA hydrogel 610 shown in FIG. 15A following melt-out, where the boxes 630, 640 indicate the locations where the swelling ratio was assessed.

Figure 16:
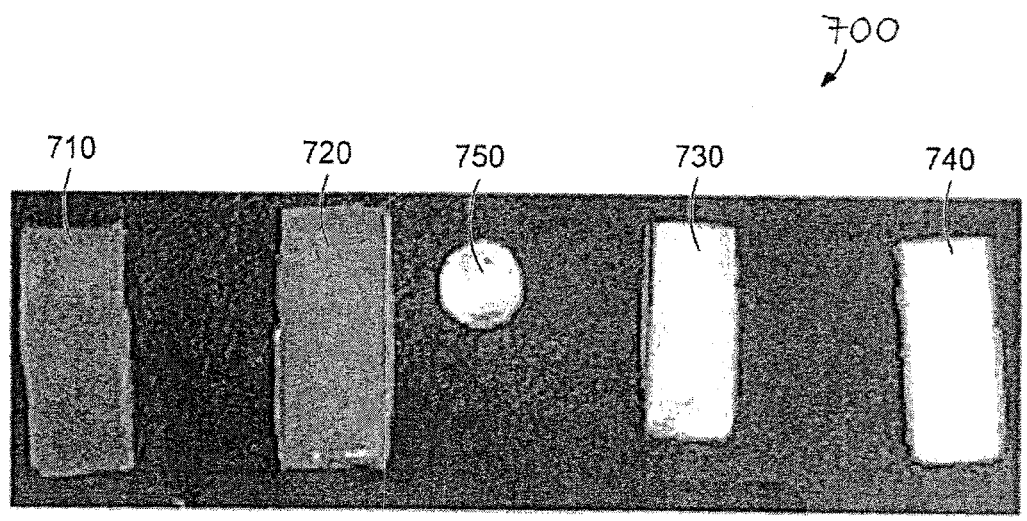

FIG. 16 shows an array 700 of PVA hydrogels prior to irradiation and melt-out, where sample 710 is a 10% PVA hydrogel formed by a single freeze-thaw cycle, sample 720 is a 20% PVA hydrogel formed by a single freeze-thaw cycle, sample 730 is a 10% PVA hydrogel formed by four freeze-thaw cycles, sample 740 is a 20% PVA hydrogel formed by four freeze-thaw cycles, and a U.S. penny 750 is provided for scale.

Figure 17:
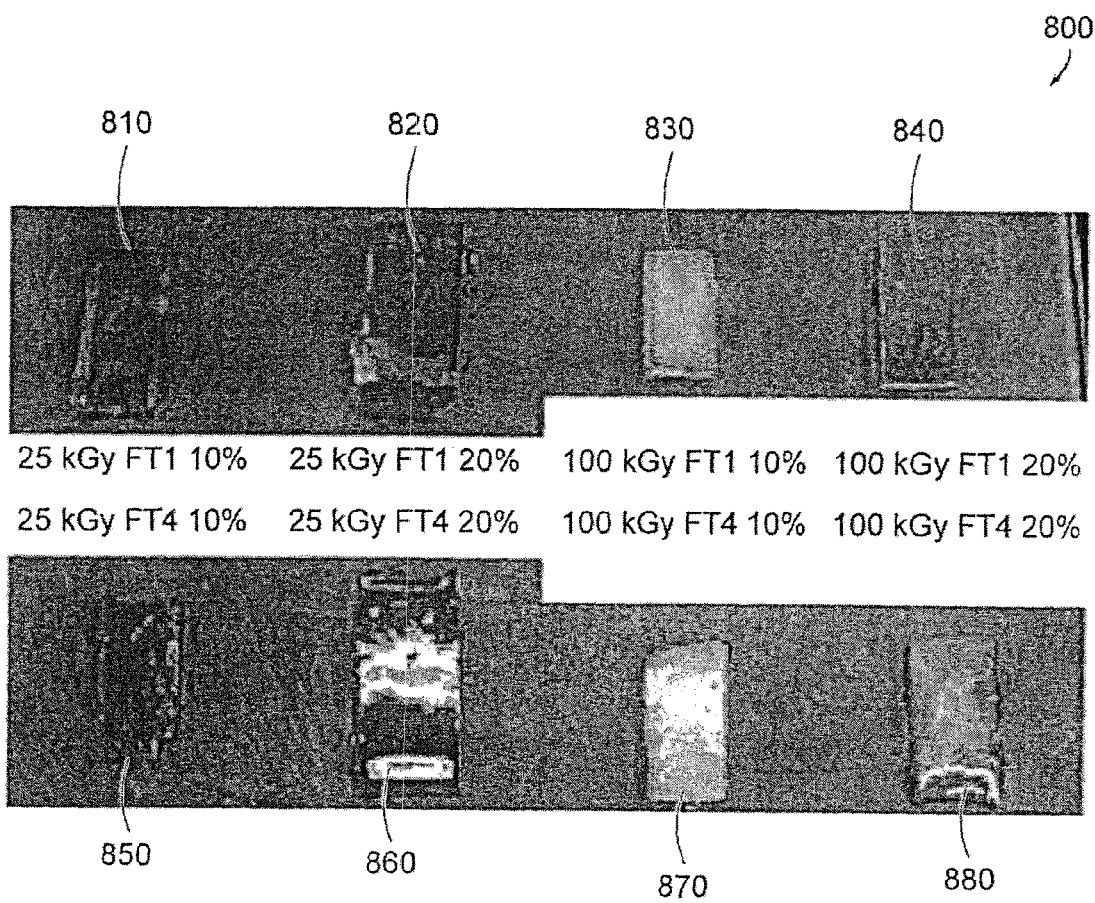

FIG. 17 shows an array 800 of PVA hydrogels after irradiation and melt-out (immersion in deionized water at 80° C.), where sample 810 is a 10% PVA hydrogel formed by a single freeze-thaw cycle and irradiated to 25 kGy, sample 820 is a 20% PVA hydrogel formed by a single freeze-thaw cycle and irradiated to 25 kGy, sample 830 is a 10% PVA hydrogel formed by a single freeze-thaw cycle and irradiated to 100 kGy, sample 840 is a 20% PVA hydrogel formed by a single freeze-thaw cycle and irradiated to 100 kGy, sample 850 is a 10% PVA hydrogel formed by four freeze-thaw cycles and irradiated to 25 kGy, sample 860 is a 20% PVA hydrogel formed by four freeze-thaw cycles and irradiated to 25 kGy, sample 870 is a 10% PVA hydrogel formed by four freeze-thaw cycles and irradiated to 100 kGy, and sample 880 is a 20% PVA hydrogel formed by four freeze-thaw cycles and irradiated to 100 kGy.

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Covalently cross-linked poly(vinyl alcohol) (PVA) gels can be produced by making a physically associated PVA hydrogel that has a crystalline phase, forming covalent crosslinks by exposing the physically associated PVA hydrogel to an effective amount of ionizing radiation, and removing the physical associations by exposure to a temperature above the melting point of the physically associated crystalline phase to produce a covalently cross-linked vinyl polymer hydrogel. The physical properties of the produced hydrogel can be adjusted by varying controlled parameters such as the proportion of physical associations, the concentration of polymer and the amount of radiation applied. PVA covalently cross-linked vinyl polymer hydrogels can be made translucent, preferably transparent, or opaque depending on the processing conditions. The stability of the physical properties of the produced hydrogel can be enhanced by controlling the amount of covalent crosslinks.

As noted above in the Background, the formation of physical associations and crystalline structure in PVA is known in the art to be accomplished effectively by freeze-thaw cycling or changing the solvency of the water enclosed in the PVA by adding a material that draws water from the PVA. It is believed that the crystalline regions are formed by forcing the PVA chains into close proximity, thereby allowing the chains to form physical associations. These physical associations form the network of the PVA hydrogel and hold it together. As noted above, three models have been proposed to explain formation of physical associations that are formed during the freeze-thaw cycle: 1) direct hydrogen bonding; 2) direct crystallite formation; and 3) liquid-liquid phase separation followed by a gelation mechanism.

There are two known techniques that are useful for forcing the PVA chains into close proximity to form physical associations. The first is to cool a PVA solution down to −10° C., which causes the water to separate from the PVA and causes the PVA to crystallize. Upon warming to room temperature, a gel has formed. This process forms a gel termed a 'cryogel', with reference to the cooling step.

A second technique is to change the solvency of the water in the PVA by adding a material that draws the water from the PVA, again forming crystalline junctions but at temperatures greater than 0° C. These gels are termed 'thetagels', referring to forming the gel by contacting a PVA solution into a solvent which has a Flory interaction parameter, that is higher than the theta point for the PVA solvent pair, and subsequently immersing the contained PVA in another solvent having a Flory interaction parameter lower than the theta point for the PVA solvent pair. Techniques useful for producing thetagels are disclosed in U.S. published patent application US20040092653.

Polymers in solution are complex molecules in perpetual dynamic motion. The configuration of an ideal polymer chain is usually described as a "random walk", where the molecule is assumed for simplicity to be freely jointed and free to move where it will. This behavior results in the polymer assuming a spherical shape with a Gaussian distribution. In reality the chain has a number of forces acting on it to define its shape and behavior. In free solution the chain is subject to random motion from Brownian fluctuations arising out of the temperature of the system. At the same time there is a force arising out of how the chain interacts with itself (since it is a long, extended molecule) and its surroundings.

If the polymer is easily solvated by the solution (i.e., it is in a first solvent not having a value sufficient for gelation) it swells as it tries to maximize the amount of polymer chain that is exposed to the solvent. In the first solvent, the energy of interaction between a polymer element and a solvent molecule adjacent to it exceeds the mean of the energies of interaction between the polymer-polymer and solvent-solvent pairs as described by Flory, P. J. in, Principles of Polymer Chemistry, page 424, Cornell University Press, 1953. The chain is now in a perturbed state and resists contact with neighboring chains and equally resists mechanical compression and deformation. As the solvency changes, this swollen configuration collapses as the quality of the solvent falls.

At the theta point, the solvent quality is such that the random Brownian motions are enough to keep the chain in an ideal, Gaussian distribution. Below this critical threshold the chain segments prefer to be next to each rather than to a solvent molecule, and the chain shrinks (i.e. a second solvent having a value sufficient for gelation). The Flory interaction parameter, is dimensionless, and depends on temperature, pressure, etc. The first solvents have a low, while the second solvents have a high, with a transition at about =0.5. The case=0 corresponds to a solvent which is very similar to a monomer. In a lattice model this is the case where the free energy comes entirely from the entropy associated with various chain patterns on the lattice. In such a case, temperature has no effect on structure, and the solvent is said to be "athermal." Athermal solvents are a particularly simple example of good solvents. In most cases the parameter is positive as described by de Gennes, P. G. in, Scaling Concepts in Polymer Physics, First ed. p. 72: Cornell University Press (1979). If the solvent quality is poor enough, the chain will completely precipitate out of solution. This effect can also be obtained by manipulation of the temperature of the solution.

Once the concentration of the polymer solution is high enough, adjustment of the solvent quality can be achieved by replacing at least part of a first solvent with a second solvent that forces inter-chain interaction as well as intra-chain interaction. Once the physical crosslinking has occurred, the later presence of a good solvent, which naturally swells the free polymer, is balanced by the physical crosslinking. With inter-chain associations the polymer chains are now constrained at certain pinning-points. Consequently as the polymer is solvated, and stretches, it becomes more deformed and is forced into tension. It is the competition between the solvation of the polymer chains and this tension in the deformed chains that give gels their interesting mechanical behaviors. In addition, under certain conditions the polymer chains can be ionized, consequently generating a charge. Adjacent like charges will result in further swelling due to electrostatic repulsion. This is part of the mechanism that gives natural cartilage (collagen and glycosaminoglycans) its high modulus, as well as high hygroscopic properties.

Whether the PVA hydrogel is formed by the freeze-thaw technique or the solvent manipulation approach, in both cases if the formed hydrogel, lacking any additional covalent bond formation from irradiation, is raised above the melting point of the physical associations (around 80° C.), the hydrogel returns into solution and does not reform, even when cooled to room temperature. This characteristic is described in the PVA literature as 'thermoreversible", since the PVA gel can be easily reverted back to a PVA solution by heating alone. To re-form the hydrogel the physical associations of the crystalline regions must be re-established using one of the two techniques, e.g., the freeze-thaw technique, discussed above.

The PVA hydrogels of the present invention can be made to have a wide range of mechanical properties, such as very low to moderately high compressive moduli. Critical to the final modulus is the number of physical associations present in the precursor gels. A large number of physical associations serve to reduce the total yield of the radiation induced crosslinks, reducing the final modulus of the material. Thus, precursor gels having relatively weak physical associations produce stronger covalently cross-linked vinyl polymer hydrogels. This phenomenon allows control of the final material properties by modulation of the physical associations in the precursor gel.

The porosity and pore size in covalently cross-linked vinyl polymer hydrogels can be controlled in that the melt-out step removes physical associations, leaving voids of controllable volume. This is not possible by direct irradiation of PVA solutions. In addition, upon completion of the processing, they will be inherently sterile due to the irradiation processing.

Polyvinyl alcohols can be manufactured from polyvinyl acetate by alcoholysis using a continuous process. Polyvinyl alcohols are commonly divided into "fully hydrolyzed" and "partly hydrolyzed" types, depending on how many mole-percent of residual acetate groups remain in the molecule. By varying the degree of polymerization of the polyvinyl acetate and its degree of hydrolysis (saponification) a number of different grades can be supplied. Typically, suitable polyvinyl alcohols for the practice of the present invention have a degree of hydrolysis (saponification) of about 80-100 percent, preferably about 95-99.8 percent. The degree of polymerization of suitable polyvinyl alcohols for the practice of the present invention is in the range of about 100 to about 50,000, preferably about 1,000 to about 20,000.

Crosslinks in PVA gels may be either covalent (chemical) crosslinks or physical associations (physical). Covalent crosslinks are formed typically through chemical modification, or through irradiation. In general, the formation of a thetagel includes a step of mixing the vinyl polymer solution with a gellant, wherein the resulting mixture has a higher Flory interaction parameter than the vinyl polymer solution. In the present invention, both covalent and physical associations can be employed, in that an initially physically associated precursor gel will be covalently crosslinked by irradiation.

The use of irradiation to form covalent crosslinks has several advantages over chemical crosslinking. Chemical crosslinking is often performed by the addition of a reactive metallic salt or aldehyde and subjecting the system to thermal radiation. For example, crosslinking may be performed by adding (di-) isocyanates, urea-/phenolic-/melamine-resins, epoxies, or (poly-)aldehydes. However, the use of such reagents for chemical crosslinking can leave residues that decrease the biocompatibility of the PVA hydrogel.

Crosslink formation by irradiation of polymers in solution is a suitable method for the generation of hydro gels for biomedical use. Crosslinking via an ionization source provides adequate control of the reaction, a lower number of unwanted processes (e.g. homografting of monomer to the side of a polymer chain) and generates an end product suitable for use with little additional processing or purification. The irradiation and sterilization steps can often be combined.

As used herein, "cryogel" means a PVA gel formed by one or more cycles of cooling a PVA solution down to −10° C., followed by returning to a temperature below the melting point of the gel.

As used herein, "thetagel" means a hydrogel made by a process that includes a step of mixing the vinyl polymer solution with a gellant, wherein the resulting mixture has a higher Flory interaction parameter than the vinyl polymer solution.

As used herein, "radiogel" refers to a hydrogel in which irradiation has been used to form covalent bonds between adjacent PVA chains having physical associations, followed by a step of heating the hydrogel above the melting point of the physical associations within the crystalline phase of the hydrogel, As used herein, "gelling' means the formation of a 3-dimensional macroscale network from a solution. 'Swelling' is the increase in volume produced when a formed gel is placed in a good solvent for the gel. The gel swells to a degree depending on the quality of the solvent and the degree of network formation (crosslink density).

Figure 1A:
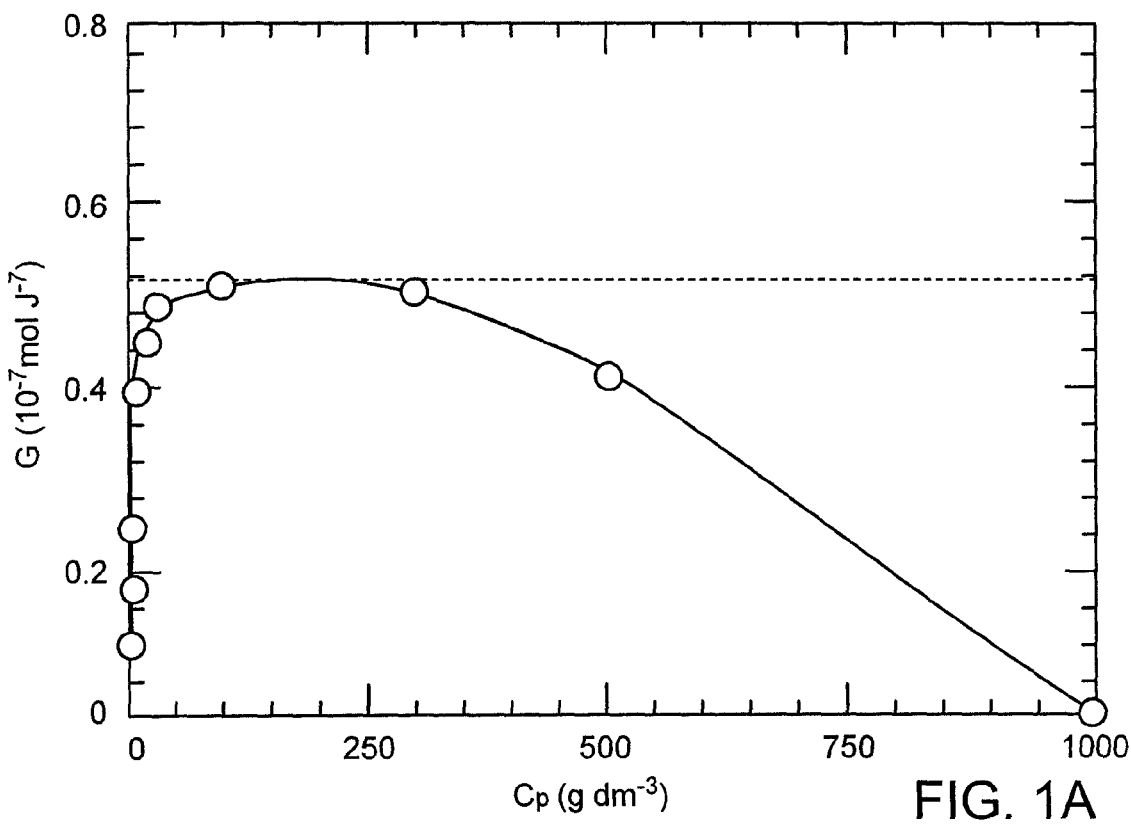
FIG. 1A is a graphic illustration of the efficiency of a dose of gamma irradiation measured as the intermolecular crosslinking yield Gx ($10^{-7}$ mol $J^{-1}$) as a function of PVA concentration, as reported in Wang, S., et al. The influence of polymer concentration on the radiation-chemical yield of intermolecular crosslinking of poly(vinyl alcohol) by gamma-rays in deoxygenated aqueous solution. Radiation Physics and Chemistry 2000 59: 91-95.
Figure 1B:
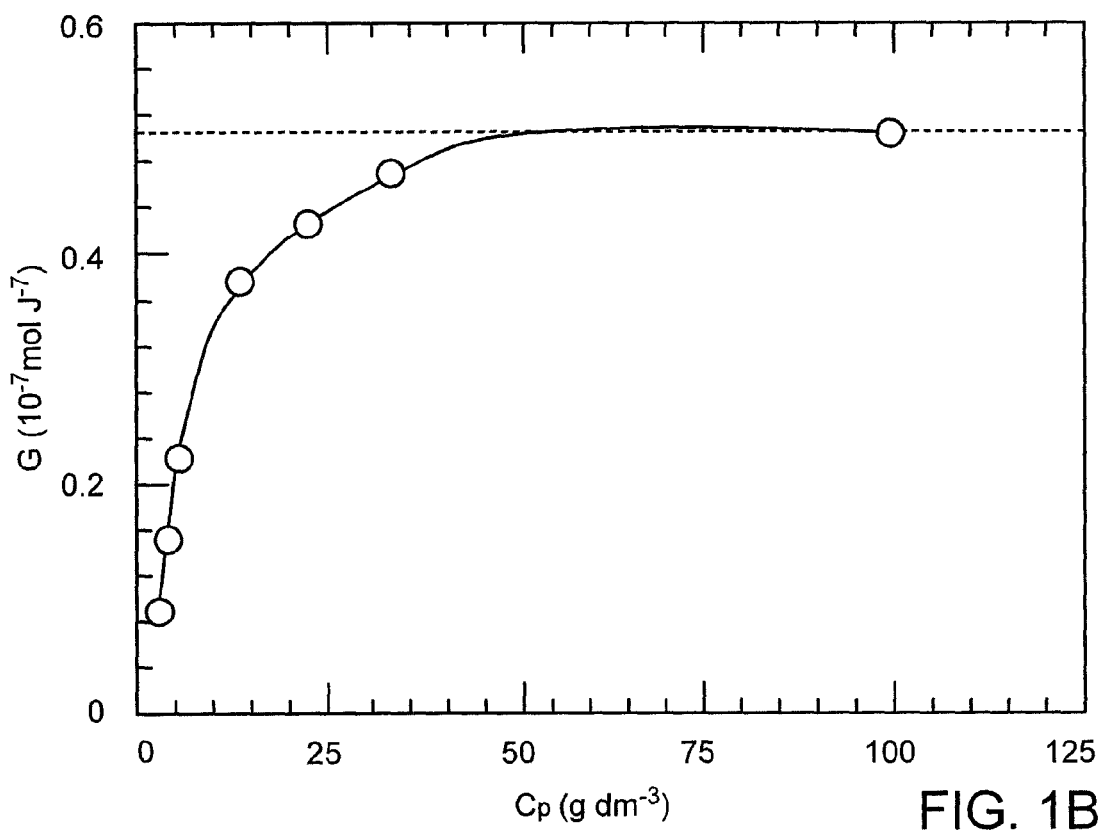
FIG. 1B is a graphic illustration of the efficiency of a dose of gamma irradiation measured as the intermolecular crosslinking yield Gx ($10^{-7}$ mol $J^{-1}$) as a function of the polymer concentration in the lower concentration range of 0-100 g $dm^{-3}$
Figure 2:
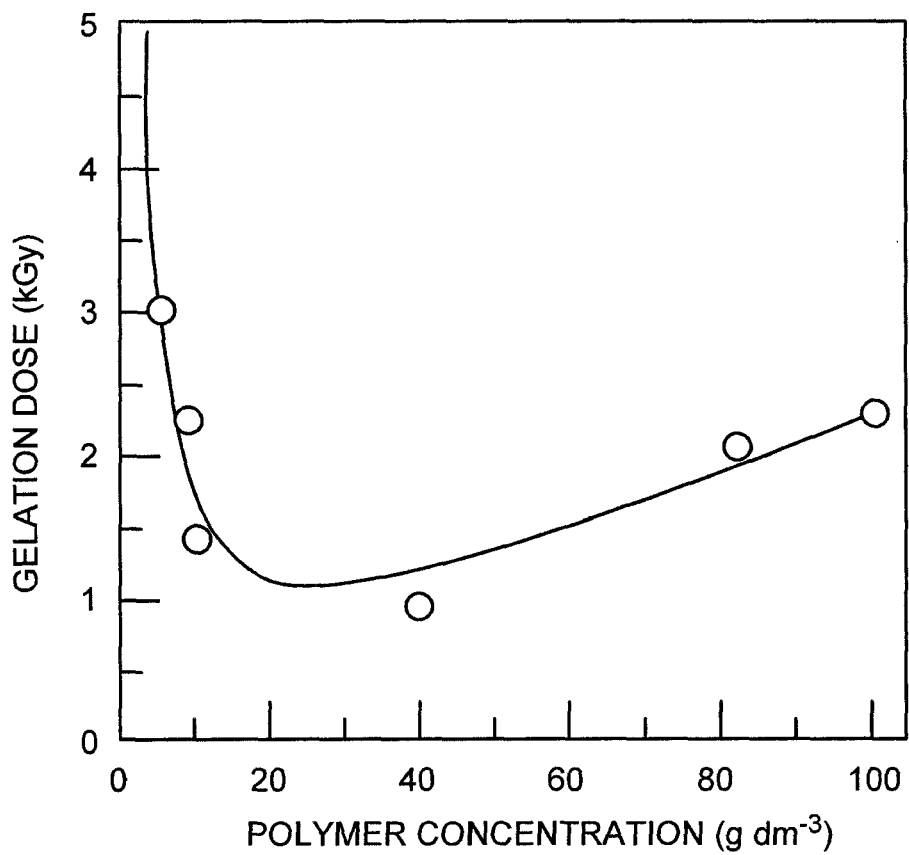
FIG. 2 is a graphic illustration of the gelation dose of gamma irradiation as a function of poly(vinyl pyrrolidone) concentration, as reported in Rosiak, J. M. & Ulanski, P., Synthesis of hydrogels by irradiation of polymers in aqueous solution, Radiation Physics and Chemistry 1999 55: 139-151. The local minimum in the range 10-40 g $dm^{-3}$ indicates an ideal polymer concentration. The roll-off at higher concentrations is due to overlapping polymer domains which restrict movement of the chains and limit the diffusion of radicals, causing chain scission instead of crosslinking. At lower concentrations, the gelling dosage increases rapidly with decreasing concentration; intramolecular cross-linking dominates because the distance between molecules is too large to facilitate intermolecular crosslinking at low polymer concentrations.
Figure 3:
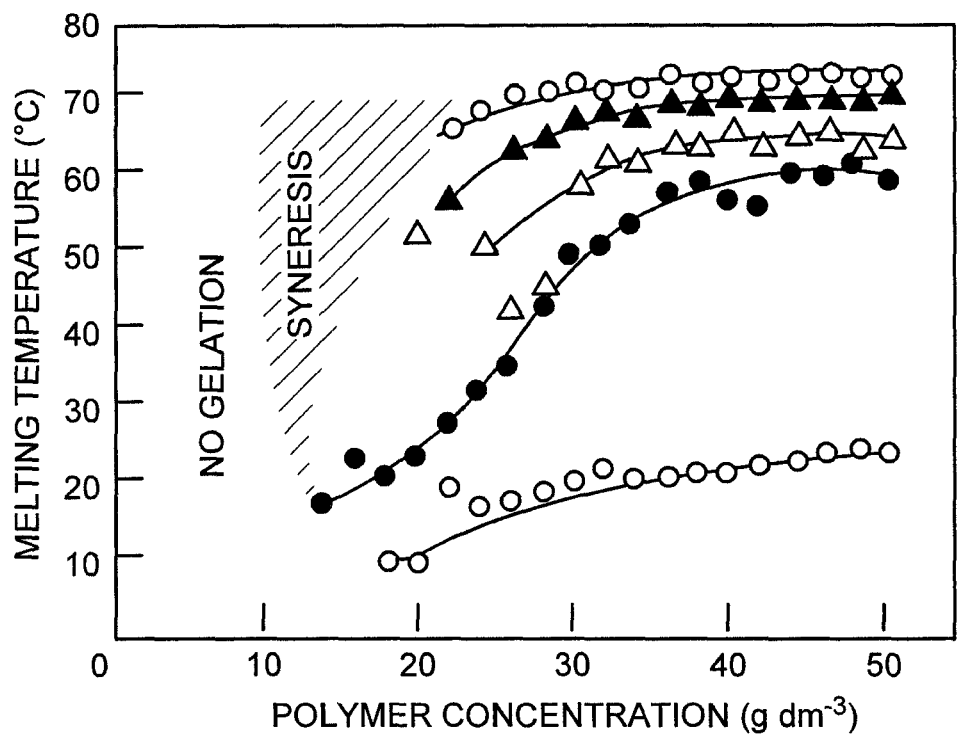
FIG. 3 is a graphic illustration of the dependence of melting temperature on polymer concentration, with a family of curves for different numbers of freeze-thaw cycles for cryogels in 1 vol % DMSO at −40° C., where open circles represent data from gels treated with one cycle, closed circles represent data from gels treated with three cycles, open triangles represent data from gels treated with four cycles, closed triangles represent data from gels treated with eight cycles and open squares represent data from gels treated with fourteen cycles.
Figure 4:
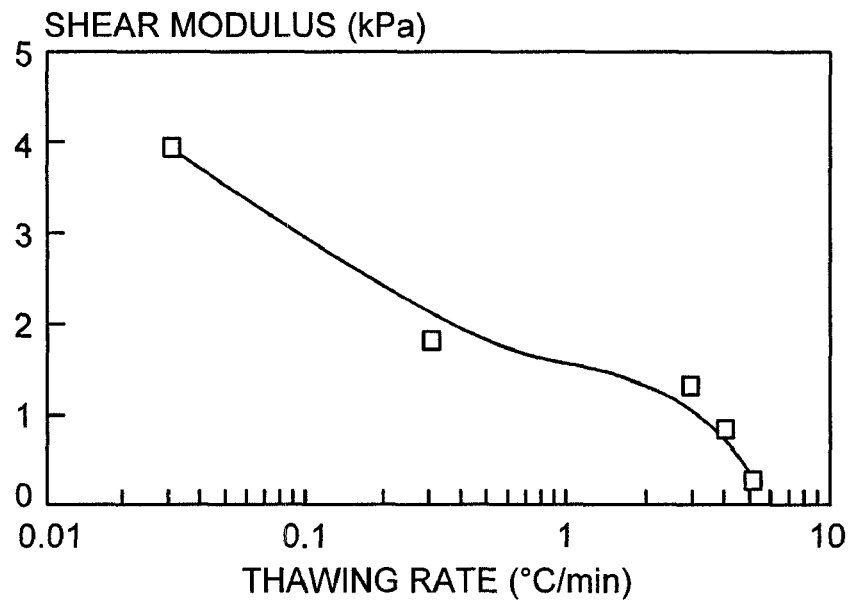
FIG. 4 is a graphic illustration of the dependence of the shear modulus on the log of the thawing rate for PVA hydrogels formed by a single freeze-thaw cycle of 7 g/dl solution of PVA in water, data from Yamaura, K., et al., Properties of gels obtained by freezing/thawing of poly(vinyl alcohol)/water/dimethyl sulfoxide solutions. Journal of Applied Polymer Science 1989 37:2709-2718.
Figure 5:
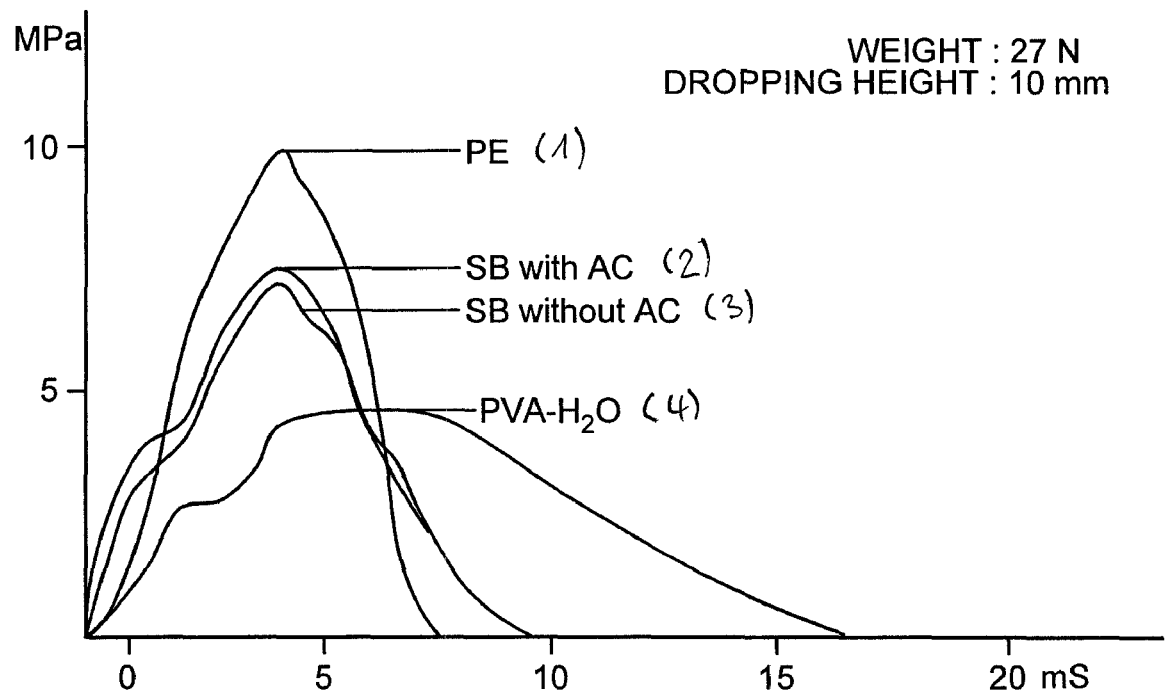
FIG. 5 is a graphic illustration of the time course of transient stresses transmitted through samples (mass=27 N) of various materials dropped from a height of 10 mm, where curve 1 is polyethylene, curve 2 is subchondral bone with articular cartilage, curve 3 is subchondral bone without articular cartilage, and curve 4 is a 20% aqueous PVA hydrogel; data are from Lozinsky, V. I. and Damshkaln, L. G., Study of cryostructuration of polymer systems. XVII. Poly(vinyl alcohol) cryogels: Dynamics of cryotropic gel formation. Journal of Applied Polymer Science 2000 77:2017-2023.
Figure 6:
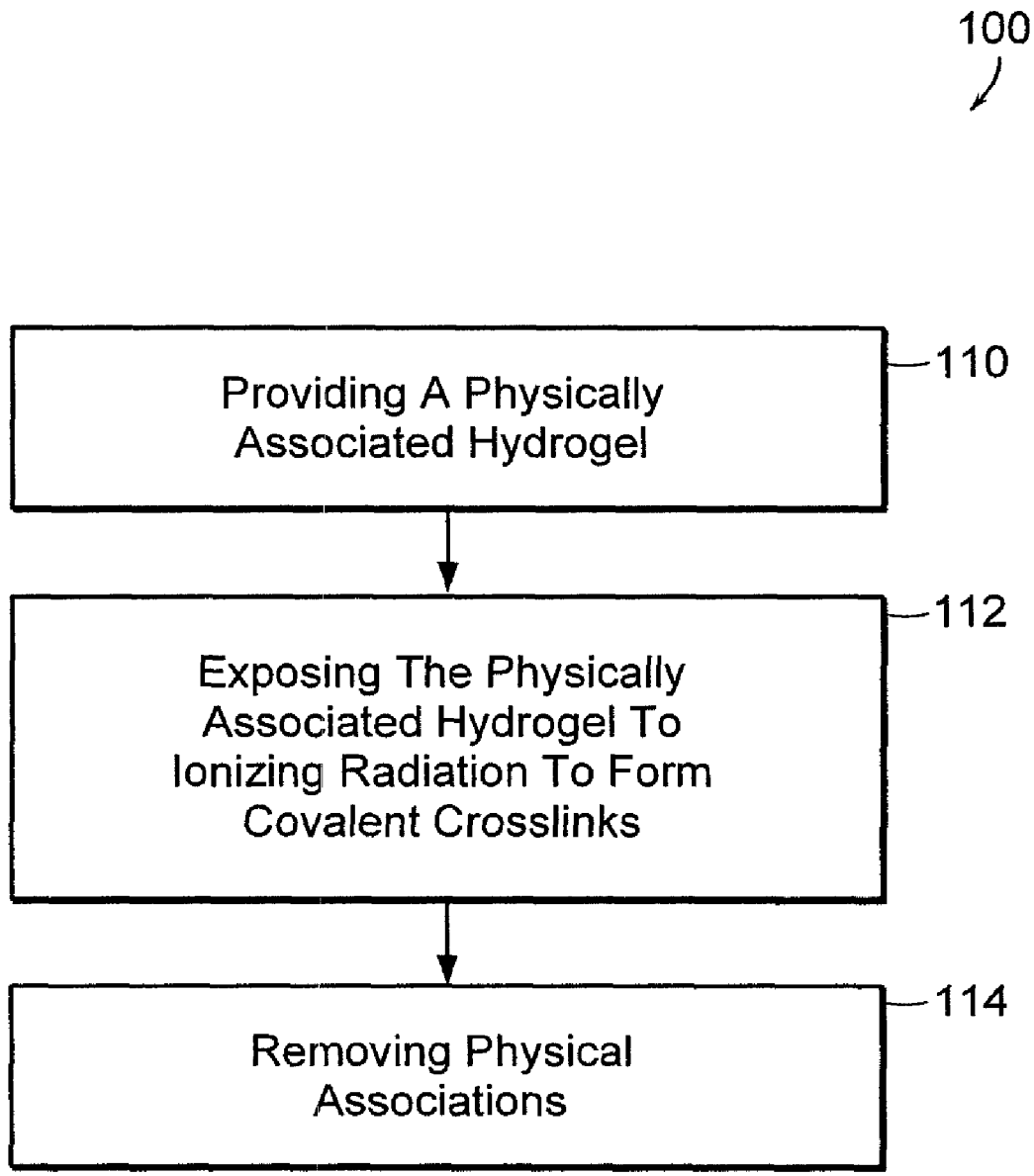
FIG. 6 is a flow chart 100 of a preferred embodiment of the method of the present invention, showing the steps of providing a physically associated hydrogel 110, exposing the physically associated hydrogel to ionizing radiation to form covalent crosslinks 112 and removing physical associations 114.
Figure 7:
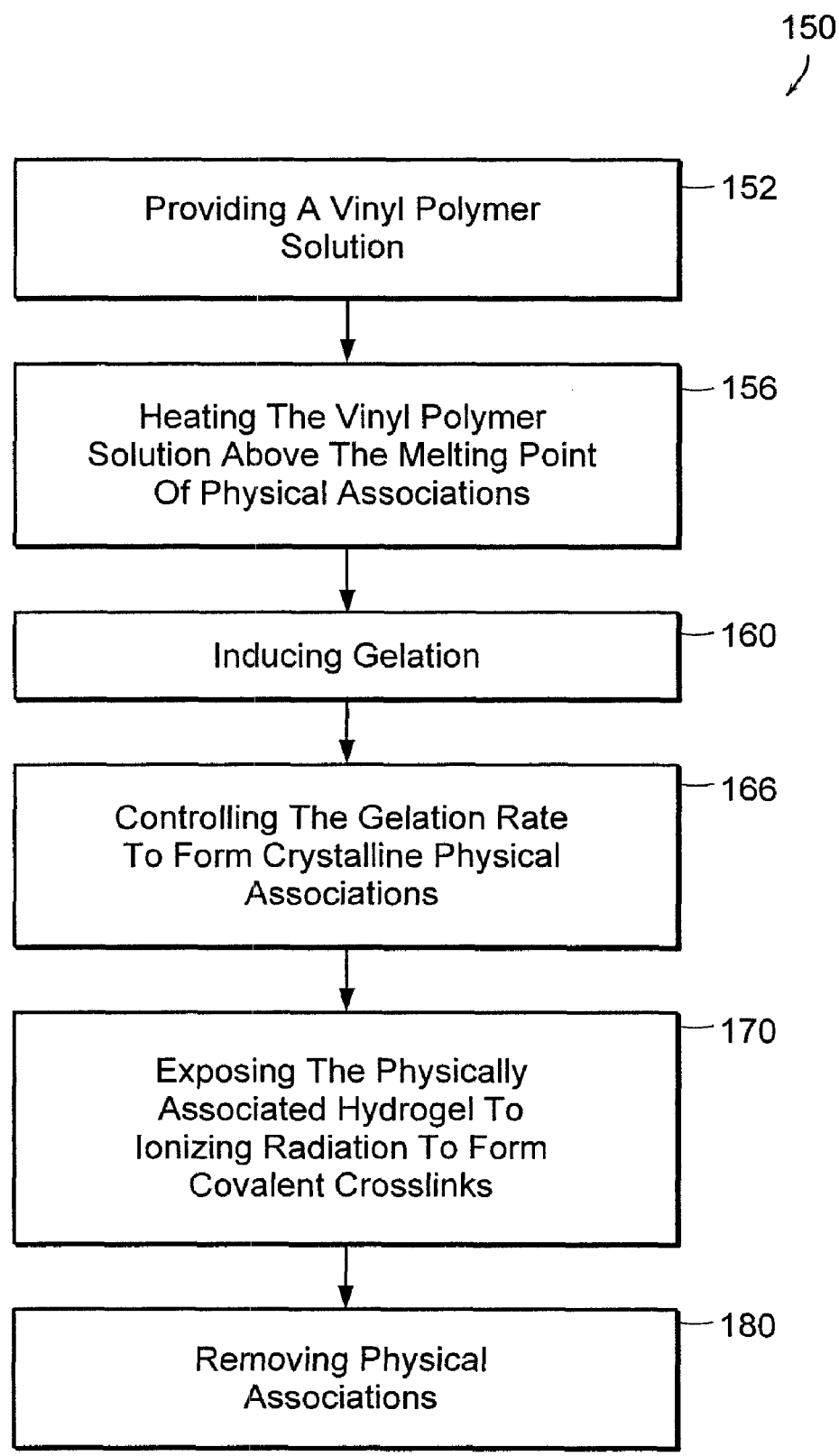
FIG. 7 is a flow chart 150 of another preferred embodiment of the method of the present invention, showing the steps of providing a vinyl polymer solution 152, heating the vinylpolymer solution above the melting point of physical associations 156, inducing gelation 160, controlling the gelation rate to form crystalline physical associations 166, exposing the physically associated hydrogel to ionizing radiation to form covalent crosslinks 170 and removing physical associations 180.

FIGS. 6 and 7 are flow charts of preferred embodiments of the method of the present invention. In a preferred embodiment, the present invention provides a method of making a covalently cross-linked vinyl polymer hydrogel comprising the steps of providing a physically crosslinked vinyl polymer hydrogel having a crystalline phase; exposing the physically crosslinked vinyl polymer hydrogel to an amount of ionizing radiation providing a radiation dose in the range of about 1-1,000 kGy effective to form covalent crosslinks; and removing the physical associations by exposing the irradiated vinyl polymer hydrogel to a temperature above the melting point of the physically associated crystalline phase to produce a covalently cross-linked vinyl polymer hydrogel. In preferred embodiments, the step of providing a physically associated vinyl polymer hydrogel having a crystalline phase includes the steps of providing a vinyl polymer solution comprising a vinyl polymer dissolved in a solvent; heating the vinyl polymer solution to a temperature elevated above the melting point of the physical associations of the vinyl polymer; inducing gelation of the vinyl polymer solution; and controlling the gelation rate to form physical associations in the vinyl polymer hydrogel. In preferred embodiments, the vinyl polymer is selected from the group consisting of poly(vinyl alcohol), poly(vinyl acetate), poly(vinyl butyral), poly(vinyl pyrrolidone) and a mixture thereof. Preferably, the vinyl polymer is poly(vinyl alcohol).

In preferred embodiments, the solvent of the vinyl polymer solution is selected from the group consisting of deionized water, methanol, ethanol, dimethyl sulfoxide and a mixture thereof. In preferred embodiments, the irradiated vinyl polymer hydrogel is immersed in a solvent selected from the group consisting of deionized water, methanol, ethanol, dimethyl sulfoxide and a mixture thereof while exposed to a temperature above the melting point.

Solutions of poly(vinyl alcohol) ($10^5$ g/mole; 93%+hydrolyzed) were prepared in water to concentrations of 10% to 20%. The solutions were cast in thin sheets (4 mm) and subject to one cycle by immersion in a NaCl/ice bath at −21° C. for eight hours and then allowing them to thaw at room temperature for four hours. The samples were then irradiated in a hydrated state to 0, 25, or 100 kGy with electron beam. Some of the resultant gels were then raised to 80° C. to melt the freeze-thaw generated crystals. Dynamic mechanical analysis was conducted at 37° C. at 1 Hz in distilled water. The resulting storage moduli for the DMA tests are shown in FIG. 8. FIG. 8 is a graphic illustration of the results of dynamic mechanical analysis of 10-20 weight percent aqueous PVA hydrogels ($10^5$ g/mole, 93%+hydrolyzed) cast as thin (4 mm) sheets and subjected to one freeze-thaw cycle by immersion in a NaCl/ice bath at −21 degrees Celsius for eight hours and then allowing them to thaw at room temperature for four hours in accordance with a preferred embodiment of the present invention. The samples were then irradiated in a hydrated state to 0, 25, or 100 kGy with an electron beam. Some of the resultant gels were then raised to 80° C. to melt the crystals generated by the freeze-thaw cycle. Dynamic mechanical analysis was conducted at 37° C. at 1 Hz in distilled water. Group 1—control (0 kGy), Group 2-25 kGy, Group 3-100 kGy. The drop in storage modulus for the "melt" samples is ascribed to the loss of thermally reversible physical associations due to freeze thawing. No melt data is shown for the 0 kGy irradiated samples since these materials completely disassociated upon melting.

The results indicate that progressively stronger irradiation of precursor gels increases the compressive modulus. However, following melt-out of the physical associations, the gels have a lower modulus than the precursor gel if they are not irradiated with at least 100 kGy. Following melt out, there is no difference in the mechanical properties of the covalently cross-linked vinyl polymer hydrogels that started with precursor gels of 10 or 20% PVA.

DMA Testing, Strongly Cross-Linked Precursor Gels—Method

Solutions of poly(vinyl alcohol) ($10^5$ g/mole; 93%+hydrolyzed) were prepared in water to concentrations of between 10% and 20%. The solutions were cast in thin sheets (4 mm) and subject to four cycles of freeze-thaw by immersion in a NaCl/ice bath at −21° C. for eight hours and then allowing them to thaw at room temperature for four hours prior to the next cycle. The samples were then irradiated in a hydrated state to 0, 25, or 100 kGy with electron beam. Some of the resultant gels were then raised to 80° C. to melt the freeze-thaw generated crystals. Dynamic mechanical analysis was conducted at 37° C. at 1 Hz in distilled water.

The resulting storage moduli for the DMA tests are shown in FIG. 9. FIG. 9 is a graphic illustration of the results of dynamic mechanical analysis of 10-20 weight percent aqueous PVA hydrogels ($10^5$ g/mole, 93%+hydrolyzed) cast as thin (4 mm) sheets and subjected to four freeze-thaw cycles by immersion in a NaCl/ice bath at −21 degrees Celsius for eight hours and then allowing them to thaw at room temperature for four hours in accordance with a preferred embodiment of the present invention. The samples were then irradiated in a hydrated state to 0, 25, or 100 kGy with an electron beam. Some of the resultant gels were then raised to 80° C. to melt the crystals generated by the freeze-thaw cycle. Dynamic mechanical analysis was conducted at 37° C. at 1 Hz in distilled water. Group 1-control (0 kGy), Group 2-25 kGy, Group 3-100 kGy. The drop in storage modulus for the "melt" samples is ascribed to the loss of thermally reversible physical associations due to freeze thawing. No melt data is shown for the 0 kGy irradiated samples since these materials completely disassociated upon melting.

The data presented in this figure demonstrate that the number of freeze-thaw cycles (which can be correlated to the amount of PVA involved in physical associations) reduces the net effectiveness of the irradiation. A 10% PVA gel subjected to one freeze thaw cycle and 100 kGy has a modulus of 200 kPa following melt-out (FIG. 8). The same process performed on a precursor 10% PVA gel subjected to four freeze thaw cycles yields a modulus of 90 kPa. Thus, the stronger the physical associations in the precursor gel, the lower the yield of chemical cross-links induced by radiation. This result also suggests the possibility that gradient gels can be created by first generating a gradient in physical associations (e.g. by differential dehydration of PVA gels) and then subjecting the precursor gel to a uniform irradiation. The final gel will have gradient in cross-linking opposite in direction to that formed in the precursor gel.

EXAMPLE 1

Cylindrical covalently cross-linked vinyl polymer hydrogels were irradiated using a uniform irradiation distribution. Solutions of poly(vinyl alcohol) ($10^5$ g/mole; 93%+hydrolyzed) were prepared in water to concentrations of 10%. The solutions were cast in thin sheets (4 mm) and subjected to one freeze-thaw cycle by immersion in an NaCl/ice bath at −21°

C. for 8 hours and then allowing them to thaw at room temperature. Disks were cut from the sheets to form cylindrical disks. The samples were then irradiated in a hydrated state to 100 kGy by electron beam. Some of the resultant gels were then raised to 80° C. to melt-out the freeze-thaw generated crystals. Swelling ratios of the gels were recorded to discern the effects of the processing on the cross-link density.

Figure 10:
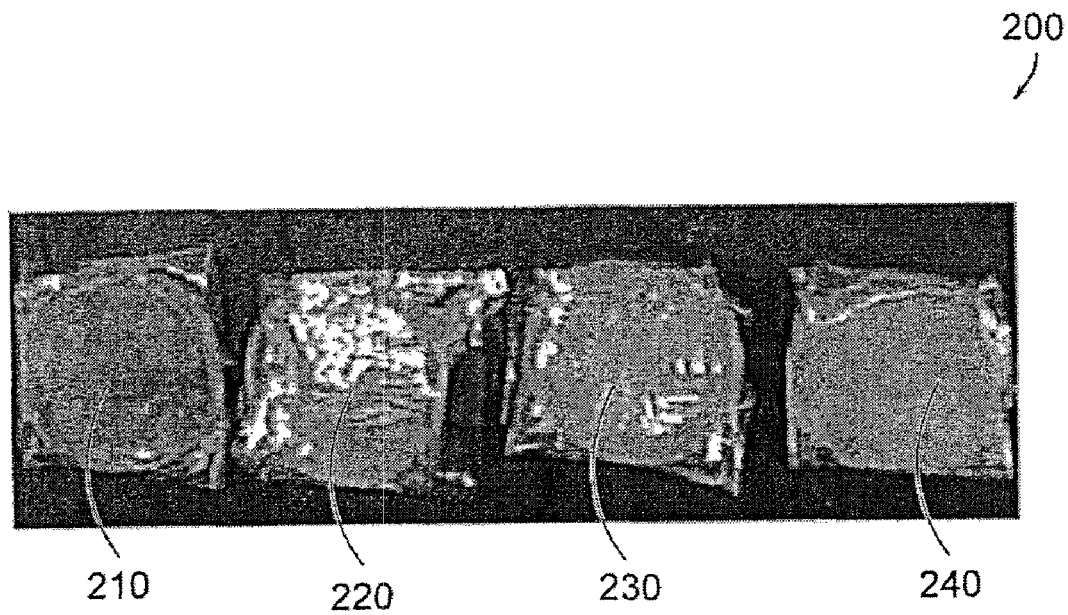
FIG. 10 shows an array 200 of four cylindrical PVA hydrogels 210, 220, 230 and 240 comprising 10% PVA formed by a single freeze-thaw cycle. Solutions of poly(vinyl alcohol) ($10^5$ g/mole; 93%+hydrolyzed) were prepared in water to concentrations of 10%. The solutions were cast in thin sheets (4 mm) and subjected to one freeze-thaw cycle by immersion in a NaCl/ice bath at −21° C. for 8 hours and then allowed to thaw at room temperature. Cylindrical disk samples were cut from the sheets.
Figure 11:
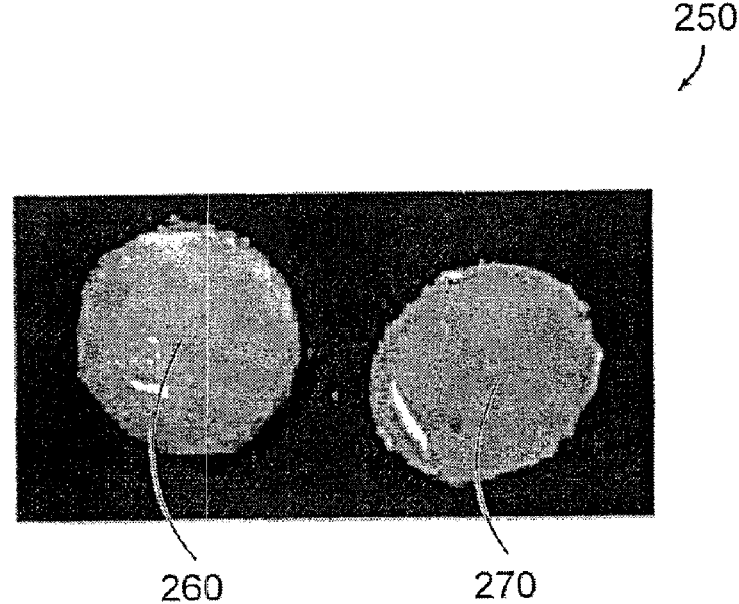
FIG. 11 shows an array 250 of two cylindrical PVA hydrogels 260 and 270 comprising 10% PVA formed by a single freeze-thaw cycle followed by irradiation, in accordance with a preferred embodiment of the present invention. Ten percent aqueous solutions of poly(vinyl alcohol) ($10^5$ g/mole; 93%+hydrolyzed) were prepared. The solutions were cast in thin sheets (4 mm) and subjected to one freeze-thaw cycle by immersion in a NaCl/ice bath at −21° C. for 8 hours and then allowed to thaw at room temperature. Cylindrical disk samples were cut from the sheets. The samples were then irradiated in a hydrated state to 100 kGy by an electron beam.

FIGS. 10 and 11 show cylindrical PVA disks, generated by one freeze thaw of 10% PVA solution, prior to and following irradiation. FIG. 10 shows an array 200 of four cylindrical PVA hydrogels 210, 220, 230 and 240 comprising 10% PVA formed by a single freeze-thaw cycle. Solutions of poly(vinyl alcohol) ($10^5$ g/mole; 93%+hydrolyzed) were prepared in water to concentrations of 10%. The solutions were cast in thin sheets (4 mm) and subjected to one freeze-thaw cycle by immersion in an NaCl/ice bath at −21° C. for 8 hours and then allowing them to thaw at room temperature. Disks were cut from the sheets to form cylindrical disks.

FIG. 11 shows an array 250 of two cylindrical PVA hydrogels 260 and 270 comprising 10% PVA formed by a single freeze-thaw cycle followed by irradiation, in accordance with a preferred embodiment of the present invention. Solutions of poly(vinyl alcohol) ($10^5$ g/mole; 93%+hydrolyzed) were prepared in water to concentrations of 10%. The solutions were cast in thin sheets (4 mm) and subjected to one freeze-thaw cycle by immersion in an NaCl/ice bath at −21° C. for 8 hours and then allowing them to thaw at room temperature. Disks were cut from the sheets to form cylindrical disks. The samples were then irradiated in a hydrated state to 100 kGy by an electron beam. Table 1 gives the gravimetric swell ratio for the gel prior to and following the radiation melt-out procedure. All swelling measurements were performed in distilled water at 23° C. The swelling is dependent on the solvent, the temperature and the crosslink density of the hydrogel. Similar gravimetric swelling ratios obtained at the same temperature with the same solvent indicate that a comparable crosslink density remains after irradiation, even though the physical associations have been removed by the melting-out step.

TABLE 1

| PVA Swelling Ratio | |
| --- | --- |
| Precursor hydrogel PVA | 6.0 |
| Covalently cross-linked vinyl polymer hydrogels | 5.8 |

Since there is virtually no change in swell ratio before and after melt-out, the process of irradiation and meltout of the PVA cryogel appears to exchange the heat labile physical associations for stable covalent crosslinks. In this case, the original swelling ratio of the final gel is retained. This indicates that the melt-out served to release the physical associations but did not result in much loss of PVA material. Thus, there must have been substantial covalent crosslinking to reinforce the weak physical crosslinking.

EXAMPLE 2

This example demonstrates that irradiation of freeze-thawed gels held in a particular shape induces "memory" of that shape. Solutions of poly(vinyl alcohol) ($10^5$ g/mole; 93%+hydrolyzed) were prepared in water to concentrations of 10 wt. %. The solutions were poured into flexible tubing with interior diameters of 0.25". The ends of each piece of tubing were sealed, the tubes were coiled into a spiral, and the spirals were subjected to one freeze-thaw cycle by immersing in a NaCl/ice bath at −21° C. for 8 hours and then allowing them to thaw at room temperature for four hours. The samples were then irradiated in a hydrated state to a radiation dose of 100 kGy using an electron beam. Some of the resultant coiled gels were then raised to 80° C. to melt the physical associations produced by the freeze-thaw treatment.

FIG. 12 shows a coil 300 formed of a PVA hydrogel 310 comprising 10% PVA showing retention of the coiled form after the melting-out of physical associations. Solutions of poly(vinyl alcohol) ($10^5$ g/mole; 93%+hydrolyzed) were prepared in water to concentrations of 10 wt. %. The solutions were poured into flexible tubing with interior diameters of 0.25". The ends of each piece of tubing were sealed, the tubes were coiled into a spiral, and the spirals were subjected to one freeze-thaw cycle by immersing in an NaCl/ice bath at −21° C. for 8 hours and then allowing them to thaw at room temperature for four hours. The samples were then irradiated in a hydrated state to 100 kGy with an electron beam. Some of the resultant coiled gels were then raised to 80° C. to melt the freeze-thaw generated associations. The coiled gels could be stretched into a straight rod, but resumed their coiled state upon release of the applied tension. Suitably sized coils can be inserted through a cannula or lumen into the intervertebral space to replace a nucleus pulposus.

EXAMPLE 3

The following examples demonstrate that both gradient and discrete shielding of the electron beam can be used to manipulate the final properties of the PVA covalently cross-linked vinyl polymer hydrogels. FIG. 13 shows three sets of PVA disks with various types of shielding to induce spatial gradients in covalent crosslinking. FIG. 13 shows an array 400 of packaged PVA disks about to undergo electron beam irradiation where disks 410, 420 received no shielding, disks 430, 440 received gradient shielding and disks 450, 460 received stepped shielding. FIG. 14A shows a continuous gradient PVA hydrogel 510 formed by a single freeze-thaw cycle and then irradiated in a hydrated state to 100 kGy with an electron beam prior to melt-out. The arrow 520 points in the direction of increasing covalent crosslinks (higher received dose). FIG. 14B shows the same continuous gradient PVA hydrogel 510 shown in FIG. 14A following melt-out having the arrow 520 pointing in the direction of increasing covalent crosslinks (higher received dose), where the boxes 530, 540 indicate the locations where the swelling ratio was assessed. Note the increase in transparency following melt-out of physical associations.

| Location of Samples | Swell Ratio |
| --- | --- |
| Low shielding (location 530, FIG. 14B) | 6.9 |
| Medium shielding (location 540, FIG. 14B) | 11.9 |
| High shielding | N/A (dissolved) |

These results indicate that gradients in covalent crosslinking can be achieved using gradient shields during the electron beam process. Less shielding results in higher cross-linking as indicated by the lower swelling ratio.

EXAMPLE 4

A physically associated PVA hydrogel was irradiated while masked by a centrally placed aluminum disk to produce a step change in radiation dose between masked and exposed regions of the hydrogel. Shielding can be utilized to crosslink PVA disks with a stepped difference in radiation crosslinks. In this embodiment the shielding is made from a material with a uniform density and thickness. In other embodiments, different locations of the shield can have different thickness or different density and shaped to determine the area and degree of reduced radiation effectiveness. The material will block radiation (e-beam or gamma) in proportion to the thickness of the shielding piece. Following radiation cross-linking, the gel can be held at high temperature to melt-out the physical associations producing a PVA hydrogel having a gradient of covalent crosslinks.

FIG. 15A shows a stepped gradient PVA hydrogel 610 formed by a single freeze-thaw cycle and then irradiated in a hydrated state to 100 kGy with an electron beam prior to melt-out. The circle 620 indicates the position during irradiation of the mask (an aluminum disk). FIG. 15B shows the same stepped gradient PVA hydrogel 610 shown in FIG. 15A following melt-out, where the boxes 630, 640 indicate the locations where the swelling ratio was assessed.

| Location of Samples | Swell Ratio |
| --- | --- |
| Low shielding (location 630, FIG. 15B) | 5.9 |
| Medium shielding (location 540, FIG. 15B) | 12.2 |

This example demonstrates the ability to create sharp changes in the material properties of the covalently cross-linked vinyl polymer hydrogels by shielding with discrete, uniform materials. The unshielded region swells half as much as the shielded region indicating a sharp increase in the number of covalent cross-links.

EXAMPLE 5

PVA covalently cross-linked vinyl polymer hydrogels suitable for use as material for contact lenses were made. In general, freeze-thaw cryogels produced in aqueous solutions do not produce clear gels (FIG. 16). In addition, PVA gels are known to be poorly permeable (permeability is a general requirement of any contact lens material). FIG. 16 shows an array 700 of PVA hydrogels prior to irradiation and melt-out, where sample 710 is a 10% PVA hydrogel formed by a single freeze-thaw cycle, sample 720 is a 20% PVA hydrogel formed by a single freeze-thaw cycle, sample 730 is a 10% PVA hydrogel formed by four freeze-thaw cycles, sample 740 is a 20% PVA hydrogel formed by four freeze-thaw cycles, and a U.S. penny 750 is provided for scale.

However, once the cryogels are irradiated and the physical associations are melted out, some of them become very transparent (FIG. 17). Also, because the bulky freeze-thaw crystals have been removed, their permeability should be greatly enhanced as well. Such materials might be useful for contact lenses. Since several gels made by differing processing steps were transparent, it is likely that a lens with a range of porosities can be made. FIG. 17 shows an array 800 of PVA hydrogels after irradiation and melt-out (immersion in deionized water at 80° C.), where sample 810 is a 10% PVA hydrogel formed by a single freeze-thaw cycle and irradiated to 25 kGy, sample 820 is a 20% PVA hydrogel formed by a single freeze-thaw cycle and irradiated to 25 kGy, sample 830 is a 10% PVA hydrogel formed by a single freeze-thaw cycle and irradiated to 100 kGy, sample 840 is a 20% PVA hydrogel formed by a single freeze-thaw cycle and irradiated to 100 kGy, sample 850 is a 10% PVA hydrogel formed by four freeze-thaw cycles and irradiated to 25 kGy, sample 860 is a 20% PVA hydrogel formed by four freeze-thaw cycles and irradiated to 25 kGy, sample 840 is a 10% PVA hydrogel formed by four freeze-thaw cycles and irradiated to 100 kGy, and sample 880 is a 20% PVA hydrogel formed by four freeze-thaw cycles and irradiated to 100 kGy.

Alternatively, gradient PVA covalently cross-linked vinyl polymer hydrogels can be made by first freeze-thawing a cylinder containing PVA solution once, or a number of times. The resulting PVA cryogel cylinders can be dehydrated in a variety of different ways (placed in warm silicone oil, dried in a vacuum, dried in air at a controlled relative humidity) such that the dehydration of the cryogel penetrates partially into the cylinder causing a radial gradient in physical associations. The resulting material can then be sectioned perpendicular to its axis to make discs and irradiated before or after subsequent rehydration. The resulting material (a gradient-dehydrated-free-thawed covalently cross-linked vinyl polymer hydrogel) should be soft on the outside and stiff in the middle. A nucleus implant created in this manner will space-fill the inner disc and carry loads while transmitting a controlled amount of that load to the annulus. The depth of modulus change can be controlled by the length of exposure to dehydration. For samples dehydrated at varying relative humidities in air, the depth and the ultimate modulus of the outer part of the gel can be controlled via exposure time and humidity.

PVA hydrogels can be useful for drug delivery applications. A desirable characteristic of drug delivery materials is the ability to control the drug release rate, often by controlling the pore size in the material. Typically a zero-order drug release rate is desired to eliminate burst effects. To accomplish this, the typical approach is to create a material that restricts diffusion only at the surface interfacing the tissue to be treated. However, the present invention can provide the ability to modulate not only pore size but gradients in pore size. Aqueous solutions of PVA are made as described above and cast into thin films. The cast gels are then freeze-thaw cycled from one to any number of times to produce varying densities of physical associations, depending on the number of cycles. The cryogels are kept in the casts and then irradiated with 1-1000 kGy. The gels are then immersed in DI at 80° C. to remove the physical associations.

As noted above, pores increase in size with the number of freezing-thawing cycles. It is thought that the polyvinyl polymer is rejected from the ice crystals as an impurity and is progressively "volume excluded" into increasingly polyvinyl polymer rich areas. As might be expected, the pore size increases with decreasing concentration of polyvinyl polymer.

Gradients in pore size are produced as follows. Aqueous solutions of PVA are made as described above and poured into thin film casts. The casts are freeze-thaw cycled 1 to 8 times to produce physical associations. The thawed cryogels are kept in the casts and then partially dehydrated (by any means). They can then be irradiated in a gradient pattern at 1 to 1000 KGy. The gels are then immersed in DI at 80° C. to remove the physical associations. Regions that are shielded from irradiation will have low to no junction points once the material is raised above its melting point, and will therefore have a pore left behind in these regions. Depending on the size of the gradient pattern, nanometer to millimeter sized holes can be made.

The claims should not be read as limited to the described order or elements unless stated to that effect. Therefore, all embodiments that come within the scope and spirit of the claims and equivalents thereto are claimed as the invention.

The invention claimed is:

1. A method of making a covalently cross-linked vinyl polymer hydrogel comprising the steps of:
   a.) providing a physically associated vinyl polymer hydrogel having a crystalline phase;
   b.) exposing said physically associated vinyl polymer hydrogel to ionizing radiation providing a radiation dose effective to form covalent crosslinks; and
   c.) removing at least a part of the physical associations from step a.) by the feed of an amount of energy sufficient to break the physical associations to be removed.

2. The method according to claim 1, wherein the step of providing a physically associated vinyl polymer hydrogel having a crystalline phase according to step a.) includes the steps of a1.) providing a vinyl polymer solution comprising a vinyl polymer dissolved in a solvent;
   a2.) heating the vinyl polymer solution to a temperature elevated above the melting point of the physical associations of the vinyl polymer;
   a3.) inducing gelation of the vinyl polymer solution; and
   a4.) optionally controlling the gelation rate to form crystalline physical associations in the vinyl polymer hydrogel.

3. The method according to claim 2, wherein the gelation of steps a3 and a4 comprises subjecting the vinyl polymer solution to at least one freeze-thaw cycle.

4. The method according to claim 2, wherein the gelation of steps a3 and a4 comprises mixing the vinyl polymer solution with a gellant and wherein the resulting mixture has a higher Flory interaction parameter than the vinyl polymer solution.

5. The method according to claim 2, wherein the gelation of steps a3 and a4 comprises dehydrating the vinyl polymer solution.

6. The method according to claim 1, wherein the ionizing radiation of step b.) comprises gamma radiation and/or beta particles.

7. The method according to claim 1, wherein the radiation dose is 1-1,000 kGy.

8. The method according to claim 1, wherein in step b.) a radiation mask is used.

9. The method according to claim 8, wherein the radiation mask is a step mask and/or a gradient mask.

10. The method according to claim 1, wherein in step c.) 1% to 100% of the physical associations are removed.

11. The method according to claim 1, wherein in step c.) the energy is fed by exposing the irradiated vinyl polymer hydrogel to a temperature above the melting point of the physically associated crystalline phase.

12. The method according to claim 1, wherein in step c.) the energy is electromagnetic radiation.

13. The method according to claim 1, wherein the vinyl polymer is selected from the group consisting of poly(vinyl alcohol), poly(vinyl acetate), poly(vinyl butyral), poly(vinyl pyrrolidone) and mixtures thereof.

14. The method according to claim 1, wherein the solvent of the vinyl polymer is a polar solvent.

15. The method according to claim 14, wherein the vinyl polymer of step c.) is immersed in the polar solvent during the feed of energy.

16. The method according to claim 14, wherein the polar solvent is selected from the group consisting of water, methanol, ethanol, dimethyl sulfoxide and mixtures thereof.

17. The method according to claim 1, wherein the vinyl polymer is highly hydrolyzed and/or has a molecular weight of 15 kg/mol to 1,500 kg/mol.

18. The method according to claim 1, wherein the vinyl polymer is highly hydrolyzed poly(vinyl alcohol) of 50 kg/mol to 300 kg/mol molecular weight.

19. The method according to claim 1, wherein the vinyl polymer is highly hydrolyzed poly(vinyl pyrrolidone) of 1,000 kg/mol to 1,500 kg/mol molecular weight.

20. The method according to claim 1, wherein the vinyl polymer has a degree of hydrolysis of 70 to 100 percent.

21. The method according to claim 1, wherein the vinyl polymer is a poly(vinyl alcohol) having a degree of hydrolysis of 80 to 100 percent.

22. The method according to claim 1, wherein the vinyl polymer has a degree of polymerization of 50 to 200,000.

23. The method according to claim 1, wherein the vinyl polymer is a poly(vinyl alcohol) having a degree of polymerization of 100 to 50,000.

24. The method according to claim 2, wherein the vinyl polymer solution is 0.5 to 80 weight percent solution of the vinyl polymer based on the weight of the solution.

25. The method according to claim 2, wherein the vinyl polymer solution is 0.5 to 50 weight percent solution of poly(vinyl alcohol) based on the weight of the solution.

26. A covalently crosslinked vinyl polymer hydrogel produced by the method of claim 1.

27. An article of manufacture comprising the covalently crosslinked vinyl polymer hydrogel of claim 26.

28. The article of manufacture of claim 27 selected from a device for delivery of active agents, a load bearing orthopedic implant, a bandage, a trans-epithelial drug delivery device, a sponge, an anti-adhesion material, an artificial vitreous humor, a contact lens, a breast implant, a stent or non-load-bearing artificial cartilage.

29. A method comprising applying the covalently crosslinked vinyl polymer hydrogel according to claim 26 as a coating.

* * * * *